(12) United States Patent
Sharma

(10) Patent No.: US 9,256,708 B2
(45) Date of Patent: Feb. 9, 2016

(54) METHOD AND SYSTEM FOR AUTOMATIC GENERATION OF SOLUTIONS FOR CIRCUIT DESIGN RULE VIOLATIONS

(75) Inventor: Karun Sharma, San Jose, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 12/948,755

(22) Filed: Nov. 17, 2010

(65) Prior Publication Data

US 2012/0124536 A1   May 17, 2012

(51) Int. Cl.
*G06F 17/50* (2006.01)
*G03F 7/20* (2006.01)

(52) U.S. Cl.
CPC ........ *G06F 17/5081* (2013.01); *G06F 17/5068* (2013.01); *G03F 7/70433* (2013.01); *G03F 7/70466* (2013.01); *G06F 2217/12* (2013.01)

(58) Field of Classification Search
None
See application file for complete search history.

(56) References Cited

U.S. PATENT DOCUMENTS

| | | | |
|---|---|---|---|
| 5,923,566 A * | 7/1999 | Galan et al. ............ | 716/52 |
| 6,083,275 A * | 7/2000 | Heng et al. ............ | 716/52 |
| 6,721,938 B2 | 4/2004 | Pierrat et al. | |
| 7,266,803 B2 | 9/2007 | Chou et al. | |
| 7,831,942 B1 * | 11/2010 | Gennari et al. ............ | 716/52 |
| 8,473,874 B1 * | 6/2013 | Sharma et al. ............ | 716/52 |
| 8,516,402 B1 * | 8/2013 | Wang ............ | 716/52 |
| 8,661,371 B1 * | 2/2014 | Wang ............ | 716/52 |
| 8,719,737 B1 * | 5/2014 | Wang ............ | 716/52 |
| 2003/0229882 A1 | 12/2003 | Ludwig et al. | |
| 2005/0044514 A1 | 2/2005 | Wu et al. | |
| 2005/0076316 A1 | 4/2005 | Pierrat et al. | |
| 2010/0017779 A1 | 1/2010 | Kim | |

FOREIGN PATENT DOCUMENTS

TW   I308284 B   4/2009

OTHER PUBLICATIONS

Heng et al., A VLSI Artwork Legalization Technique based on a New Criterion of Minimum Layout Perturbation, Proceedings of the 1997 International Symposium on Physical Design, pp. 116-121, Apr. 1997.*
U.S. Appl. No. 13/215,113, filed Aug. 22, 2011, Sharma, Karun, et al.
U.S. Appl. No. 13/215,118, filed Aug. 22, 2011, Wang, Xiaojun.
Foreign Office Action dated Jun. 11, 2014 for Taiwanese Application No. 100141866.

* cited by examiner

*Primary Examiner* — A. M. Thompson
(74) *Attorney, Agent, or Firm* — Vista IP Law Group, LLP

(57) ABSTRACT

Some embodiments provide a method for automatically generating several design solutions that remedy a design rule violation committed by a set of shapes in an IC design layout. The method receives a marker that indicates the design rule violation and contains information about the violation. The marker in some embodiments can be rendered as a geometric shape in the IC design layout. Based on the marker, the method generates several solutions each of which will cause the set of shapes to meet the design rule when the solution is applied to the set. Each solution requires moving at least one edge of a shape in the set of shapes.

15 Claims, 17 Drawing Sheets

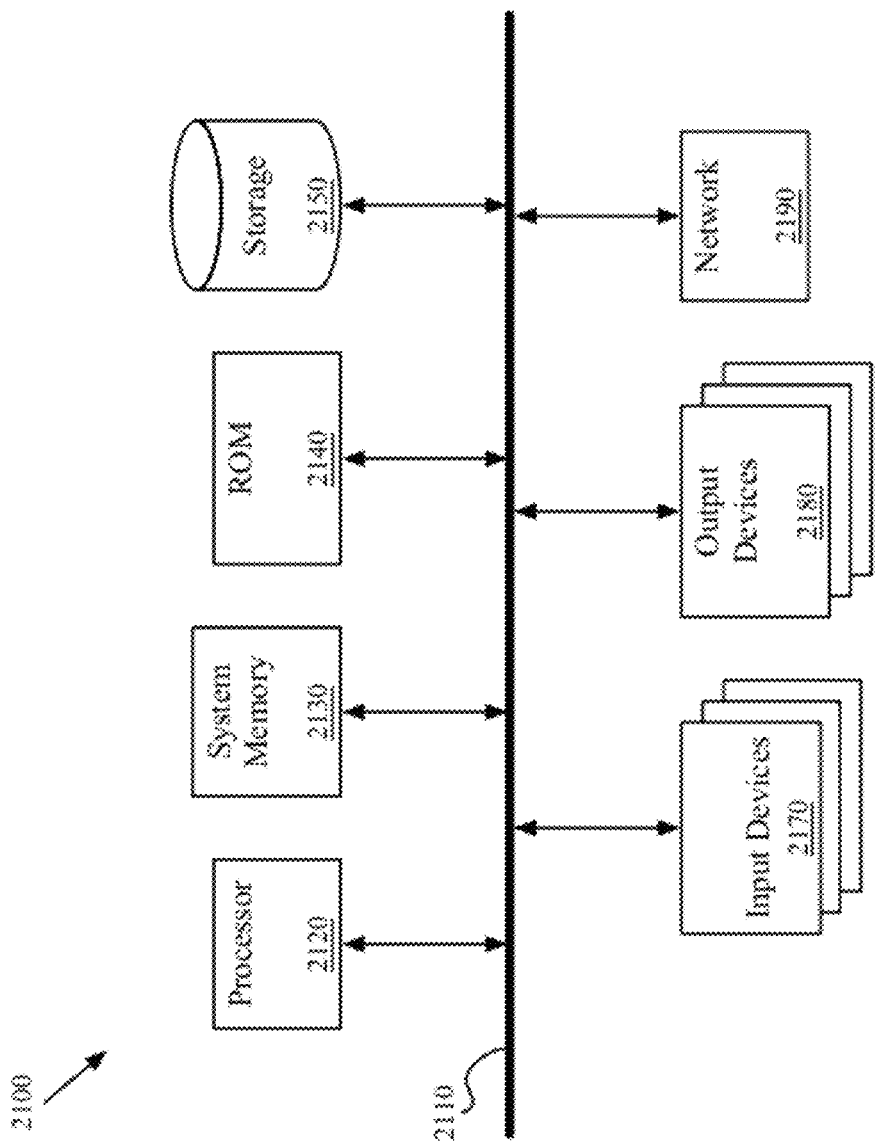

METHOD AND SYSTEM FOR AUTOMATIC GENERATION OF SOLUTIONS FOR CIRCUIT DESIGN RULE VIOLATIONS

BACKGROUND

An integrated circuit ("IC") is a device (e.g., a semiconductor device) or electronic system that includes many electronic components, such as transistors, resistors, diodes, etc. These components are often interconnected to form multiple circuit components, such as gates, cells, memory units, arithmetic units, controllers, decoders, etc. An IC includes multiple layers of wiring that interconnect the IC's electronic and circuit components.

Design engineers design ICs by transforming logical or circuit descriptions of the ICs' components into geometric descriptions, called design layouts. IC design layouts typically include (1) circuit modules (i.e., geometric representations of electronic or circuit IC components) with pins and (2) interconnect lines (i.e., geometric representations of wiring) that connect the pins of the circuit modules. In this fashion, design layouts often describe the behavioral, architectural, functional, and structural attributes of the IC. To create the design layouts, design engineers typically use electronic design automation ("EDA") applications. These applications provide sets of computer-based tools for creating, editing, analyzing, and verifying design layouts. The applications also render the layouts on a display device or to a storage for displaying later.

Fabrication foundries ("fabs") manufacture ICs based on the design layouts using a photolithographic process. Photolithography is an optical printing and fabrication process by which patterns on a photolithographic mask (i.e., "photomask," or "mask") are imaged and defined onto a photosensitive layer coating a substrate. To fabricate an IC, photomasks are created using the IC design layout as a template. The photomasks contain the various geometries (i.e., features) of the IC design layout. The various geometries contained on the photomasks correspond to the various base physical IC elements that comprise functional circuit components such as transistors, interconnect wiring, via pads, as well as other elements that are not functional circuit elements but are used to facilitate, enhance, or track various manufacturing processes.

Before the design layouts are released to fabs, the design layouts are verified against a set of design constraints or rules (e.g., a design constraint that requires a minimum distance between two geometries in a design layout) imposed on the various geometries of the IC design layouts. By abiding the design constraints, the design engineers ensure that the ICs manufactured based on the design layouts would function properly. To aid the design engineers in verifying the design layouts, some EDA applications provide design violation markers. Each of the violation markers indicates that a set of geometries of the IC design layout does not meet a design constraint or rule. These markers are in form of data and can be rendered on a display device along with the design layouts to provide visual cues for the engineers to spot and address any design rule violations.

BRIEF SUMMARY

Some embodiments provide a method for automatically generating several design solutions that remedy a design rule violation committed by a set of shapes (i.e., geometric representations of IC elements) in an IC design layout. The method receives a marker that indicates the set of shapes in the IC design violates a design rule. The marker in some embodiments contains information about the design rule violation (e.g., type and name of the violated design rule, etc.). The marker can be rendered as a geometric shape in the IC design layout. The geometric shape that represents the marker is a rectangle or a parallelogram with four vertexes. Each vertex of the geometric shape has coordinates that indicate the location of the vertex within a layer of the design layout. Based on the marker, the method generates several solutions. Each solution, when applied to the set, causes the set of shapes to meet the design rule that the set violates. Each solution requires moving at least one edge of a shape in the set of shapes.

Some embodiments select a design solution from several generated solutions and use the selected solution to remedy the design violation in the design layout. To select a design solution to use, some embodiments sequentially examine each of the design solutions to verify whether the design solution causes new design rule violations when the solution is applied. Some such embodiments select the first solution that does not cause new design rule violations when applied to the set of shapes. When every one of the generated design solutions causes new design rule violations, a design solution is selected to use based on a certain criteria (e.g., the number of new design errors that a design solution causes) and a set of markers that correspond to the new design rule violations caused by the selected design solution is generated.

To generate the design solutions to the design rule violation, some embodiments identify the type of the design rule violation that the set of shapes committed. Each type of design rule violation occurs when the set of shapes fails to meet a certain type of requirement (e.g., a minimum distance between two shapes) imposed by the design rule.

In some embodiments, all edges of all shapes in a layer of a design layout are either perpendicular or parallel to one another. These embodiments identify a set of relevant edges of the marker. Each relevant edge of the marker is orthogonal to the edges of shapes in the design layout in some embodiments. The relevant edges of the set of shapes are also identified. Each relevant edge of the set of shapes abuts a relevant edge of the marker. The difference between a rule value of the violated design rule and a layout value of the set of shapes is then calculated. The rule value of the design rule in some embodiments is the value of the requirement (e.g., a numerical value of a minimum distance between two shapes). The layout value of the set of shapes in some embodiments is a value that represents a geometric attribute of the set of shapes' layout (e.g., a numerical value of a distance between two shapes in the set) in the IC design layout. Based on the calculated difference, some embodiments generate a set of edge movements, which are specified as the set of design solutions.

Some of design rule violation types include a space violation, a width violation, an area violation, and an edge violation. A design solution to each type of violation includes moving a set of relevant edges of a set of relevant shapes in the design layout in some embodiments. A space violation is a violation of a design rule that requires two shapes in a design layout to be at least a certain distance apart from each other in some embodiments. A design solution to a space violation in some embodiments includes moving a relevant edge of one of the two shapes that violate the design rule or moving a pair of relevant edges of the two shapes.

A width violation is a violation of a design rule that requires a shape in a design layout to have at least a certain width. A design solution to a width violation in some embodiments includes moving a relevant edge of the shape that violates the rule or moving a pair of relevant edges of the shape in order to increase the width of the shape.

An area violation is a violation of a design rule that requires a shape to have at least a certain area or size in the IC design layout. A design solution to an area violation in some embodiments includes moving a relevant edge of the shape that violates the rule, moving a pair of relevant edges of the shape, or moving all relevant edges of the shape in order to enlarge the size of the shape.

An edge violation is a violation of a design rule that requires a set of shapes that form an inward edge (or an inward corner) to have at least certain length along the shapes' edges that form the inward corner. A design solution to an edge violation in some embodiments includes moving a relevant edge of the set of shapes that violates the rule and moving a pair of relevant edges of the set of shapes in order to remove the inward corner.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

FIG. 21 illustrates a computer system with which some embodiments of the invention are implemented.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide a method for automatically generating several design solutions (also referred to as design hints) that remedy a design rule violation committed by a set of shapes in a layer of an IC design layout. The method receives a marker that indicates the set of shapes in the IC design that violates a design rule. In some embodiments, a marker includes different pieces of information about the set of shapes and the design rule that the set of shapes violates. For instance, a marker includes identification of the design rule, identification of the design layout that includes the set of shapes that violates the design rule, identification of the layer of the design layout on which the rule is violated, location information (e.g., coordinates) of the set of shapes on the design layout, etc.

A marker in some embodiments is rendered as a geometric shape (e.g., a rectangle or a parallelogram) in the IC design layout. In some such embodiments, a marker is rendered using a set of coordinates of the vertexes of the geometric shape in a layer of the design layout. Based on the marker, the method generates several solutions. Each solution, when applied to the set, causes the set of shapes to meet the design rule that the set violates. Each solution requires moving at least one edge of a shape in the set of shapes.

Figure 1:
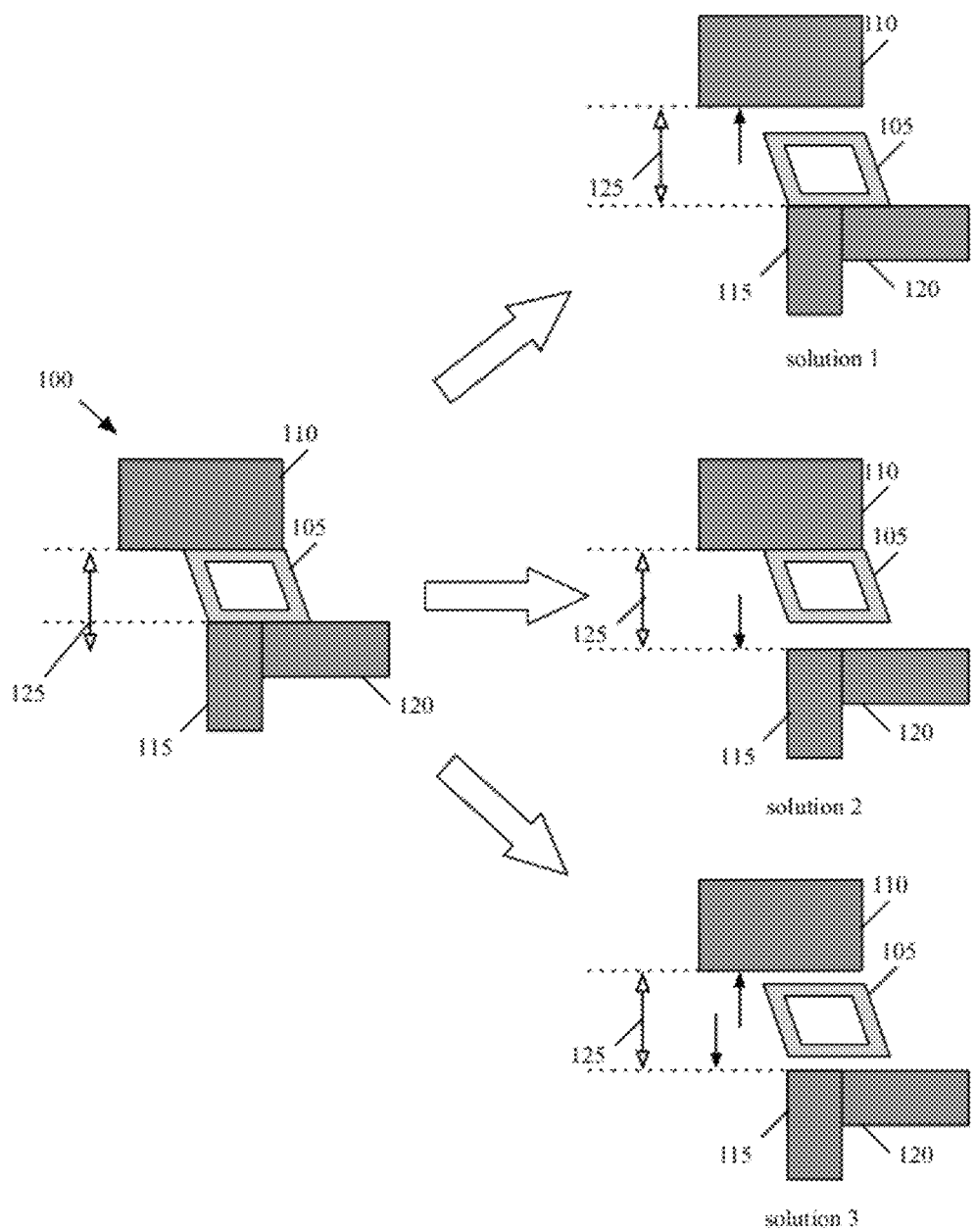
FIG. 1 illustrates design solutions in some embodiments for a design rule violation.

FIG. 1 illustrates an example of a design rule violation committed by a set of shapes in a layer of a design layout 100 and example design solutions 1-3 that remedy the design violation. FIG. 1 illustrates a marker 105 and three shapes 110-120 in a layer of the design layout 100.

A design layout in some embodiments includes (1) circuit modules (i.e., geometric representations of electronic or circuit IC components) with pins and (2) interconnect lines (i.e., geometric representations of wiring) that connect the pins of the circuit modules. The circuit modules and interconnect lines are referred to as shapes or segments. A design layout in some embodiments also includes multiple layers that represent the layers of an IC to be manufactured based on the design layout. Each of the layers in the design layout can be rendered in two-dimension on a display device to show the shapes in the layer in some embodiments.

The design layout 100 is an example design layout. As shown, the design layout 100 includes the shapes 110-120 in a layer. The design layout 100 may include other markers and other shapes in the layer and have other layers which are not illustrated in FIG. 1 for simplicity.

The marker 105 illustrated in FIG. 1 is an example marker that is rendered as a geometric shape in a layer of the design layout 100. As mentioned above, a marker may be rendered as a geometric shape such as a parallelogram. The four edges of the marker as depicted in the figure have thickness to make the edges visible in the figure. However, the edges are lines without thickness that connect the four vertexes of the parallelogram. The marker 105, by having top and bottom orthogonal edges and two diagonal side edges, indicates that the distance between the bottom edge of the shape 110. The distance between the bottom edge of the shape 110 and the top edges of the shapes 115 and 120 is shorter than a minimum distance, depicted as a bidirectional arrow 125, required by a design constraint.

A design constraint in some embodiments is a constraint that is imposed on the shapes in a design layout in order to ensure that the IC that will be manufactured based on the design layout will function properly. In other words, a design constraint is a design rule to be abided by the shapes in the design layout for the proper functioning of the manufactured IC. There are many types of design rules and each type mandates a different requirement. For instance, the type of the design rule that the shapes 110-120 are violating requires that two shapes be separated by at least a certain distance in a layer of the design layout if the two shapes are designed to be separated. Some of other design rule types will be described further below.

As shown in FIG. 1, three design solutions 1-3 are generated. Solution 1 suggests moving the shape 110 upwards by a distance (e.g., 0.005 units) defined by the difference between the minimum distance (e.g., 0.070 units) required by the design rule and the current distance (e.g., 0.065 units) between the shape 110 and the shapes 115 and 120. Solution 2 suggests moving the shapes 115 and 120 downwards (e.g., by 0.005 units) such that the distance between the bottom edge of the shape 110 and the top edges of the shapes 115 and 120 is equal to the minimum distance depicted as the bidirectional arrow 125. Solution 3 suggests moving the shape 110 upwards (e.g., by 0.0025 units) and the shapes 115 and 120 downwards (e.g., by 0.0025 units) such that the distance between the shape 110 and the shapes 115 and 120 is equal to the minimum distance. More examples of generating design solutions to different types of design rule violations will be described further below by reference to FIGS. 4-16.

Figure 2:
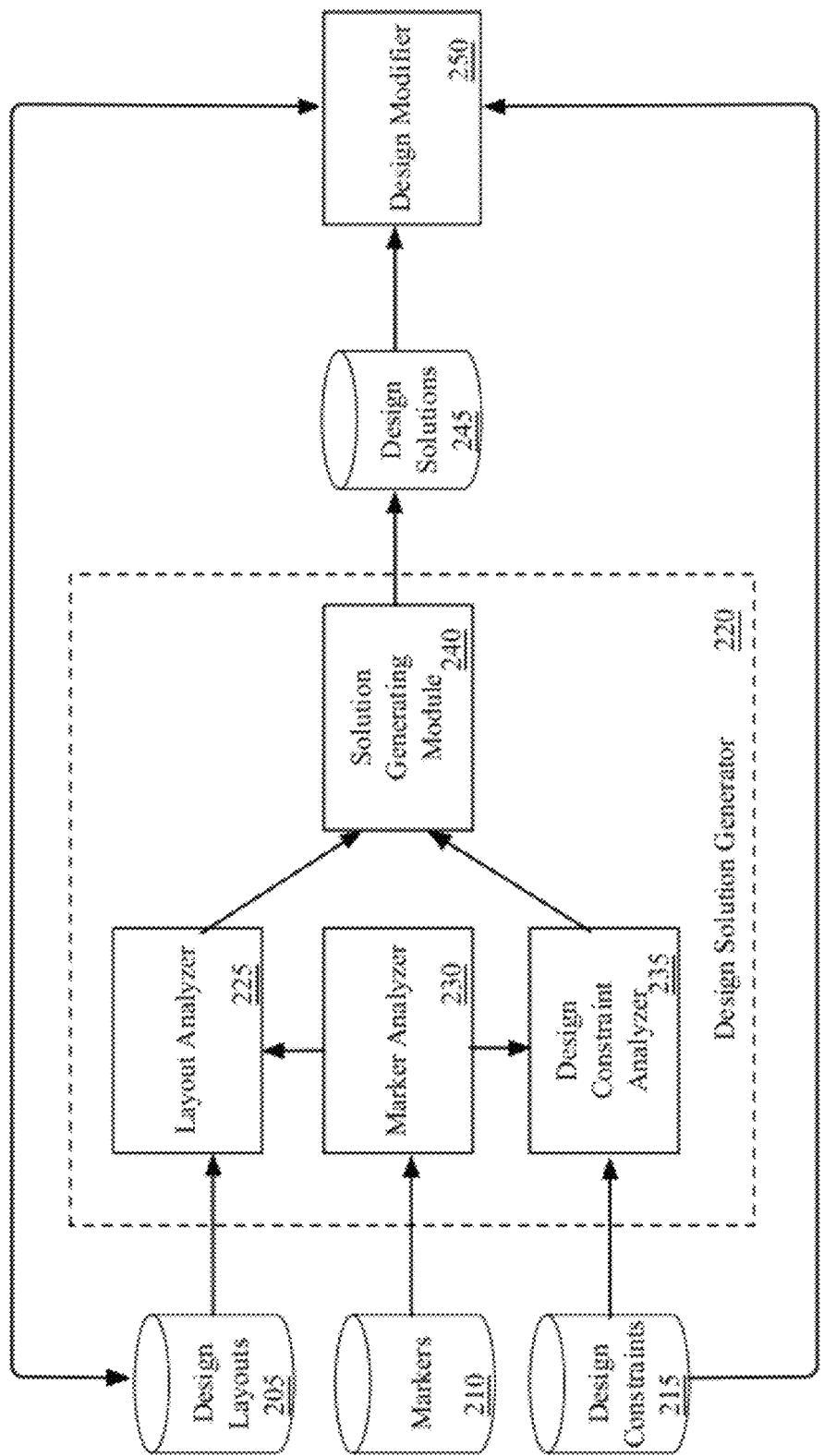
FIG. 2 illustrates a design solution generator and a design modifier of some embodiments.

FIG. 2 conceptually illustrates a design solution generator 220 that generates design solutions to a design rule violation in some embodiments. As shown, the design solution generator 220 includes a layout analyzer 225, a marker analyzer 230, a design constraint analyzer 235, and solution generating module 240. The design solution generator 220 generates several design solutions. Each of the design solutions, when applied to a set of shapes in an IC design layout, causes the set to meet a design constraint which the set fails to meet. FIG. 2 also illustrates a design layouts repository 205, a marker repository 210, design constraints repository 215, design solution generator 220, design solutions repository 245, and design modifier 250.

The design solution generator 220 receives a marker from the markers repository 210 and generates design solutions for remedying the design rule violation indicated by the marker. The design solutions generated by the generator 220 are deposited in the design solutions repository 245.

The marker analyzer 230 identifies the necessary information for generating design solutions from a marker that the marker analyzer retrieves from the markers repository 210. For instance, the marker analyzer 230 identifies the design rule that is violated, the design layout that includes the set of shapes that violates the rule, the coordinates of the marker to render the marker as a geometric shape, etc. The marker analyzer 230 sends the identified information to other modules of the design solution generator 220. For instance, the marker analyzer 230 sends the identification of the violated design rule to the design constraint analyzer 235 and sends the marker and the identification of the design layout to the layout analyzer 225.

The design constraint analyzer 235 identifies the type of the violated design rule and extracts the rule value from the design rule. As mentioned above, the rule value specified by the design rule is the value of the requirement (e.g., a numerical value of a minimum distance between two shapes) imposed by the rule. The design constraint analyzer 235 retrieves the design rule from the design constraints repository 215 by using the identification of the design rule received from the marker analyzer 230. The design constraint analyzer 235 passes on the identified rule type and the rule value to the solution generating module 240.

The layout analyzer 225 identifies the set of shapes that violates the design rule in the design layout retrieved from the design layouts repository 205. The layout analyzer 225 uses the identification of the layout received from the marker analyzer 230 to retrieve the design layout that contains the set of shapes. To identify the set of shapes, the layout analyzer 225 uses the marker it receives from the marker analyzer 230. In some embodiments, the layout analyzer 225 includes any shapes that abut the marker in the set of shapes that violate the design rule.

From the identified set of shapes, the layout analyzer 225 calculates the layout value of the set of shapes that violates the design rule. As described above, a layout value in some embodiments is the value that represents a geometric attribute of the rule-violating set of shapes in the design layout. For instance, when two shapes in the set of shapes are not separated by a minimum distance mandated by a design rule, the distance between the two shapes is the layout value of the set of shapes. The layout analyzer 225 passes on the calculated layout value along with the design layout and the set of shapes to the solution generating module 240.

The solution generating module 240 generates several design solutions to the design violation based on the difference between the rule value and the layout value. The solution generating module 240 receives the rule type and the rule value of the violated design rule from the design constraint analyzer 235. The solution generating module 240 receives the design value, the design layout, and the violating set of shapes from the layout analyzer 225. The solution generating module 240 in some embodiments deposits the generated design solutions for the design violation in the design solutions repository 245.

When the violated design rule is a type of rule that requires that any two shapes in the design layout be separated by a minimum distance defined by the rule value, the solution generating module 240 determines which of the shapes in the set should be moved in order for the set of shapes to be separated by a distance greater than or equal to the minimum distance defined by the rule value. The solution generating module 240 compares the rule value with the layout value and determines the distance and direction of the movement of the shapes that have to be moved. As will be described below, there can be more than one such design solutions for each type of a violated design rule. For instance, one solution suggests moving one of the two violating shapes by the certain distance in the certain direction while another solution suggests moving the other of the two shapes by the same distance in the opposite direction. Also, a different design solution in some embodiments suggests moving an edge of a shape towards the center of the shape instead of moving the entire shape. In some embodiments, each of these design solutions is described using a set of coordinates of the shapes in the layer of the design layout that indicates the new locations of the shapes when the shapes are moved.

The design modifier 250 modifies the design layout by using a design solution that it selects from the several design solutions generated by the design solutions generator 240. The design modifier 250 retrieves the design solutions from the design solutions repository 245 and then selects a design solution to use. The design modifier 250 of different embodiments selects a design solution differently. For instance, the design modifier 250 in some embodiments sequentially analyzes each of the retrieved design solutions to verify whether applying the solution results in new design rule violations in the design layout. The design modifier 250 verifies the solutions against the design rules it retrieves from the design constraints repository 215 in these embodiments. The design modifier in these embodiments then selects the first solution that does not result in any new rule violations. As another example, the design modifier 250 in some embodiments first identifies all such design solutions that do not cause any new design violations in the design layout and selects a design solution from the identified design solutions. An example criterion for the selection of a design solution is the number of shapes to be moved or modified in the design layout.

The design layouts repository 205 stores design layouts. The design layouts repository 205 in some embodiments receives the design layouts from design software applications which design engineers use to design ICs. The design layouts repository 205 stores the design layouts by using a data format, e.g., GDS II stream format (GDSII).

The design constraints repository 215 stores design constraints. The design constraints repository 215 in some embodiments receives design constraints from design software applications which generate design constraints according to the design engineers' inputs.

The marker repository 210 stores markers. The marker repository 210 in some embodiments receives markers from design software applications which generate markers by verifying the shapes in a design layout against each of the available design constraints. In this manner, a design solution module or software application can be independent of the software applications that generate markers.

The design solutions repository 245 stores design solutions generated by the design solution generator 220. Some example data structures for design solutions as well as design layouts, design constraints, and markers will be described further below by reference to FIG. 20.

Figure 3:
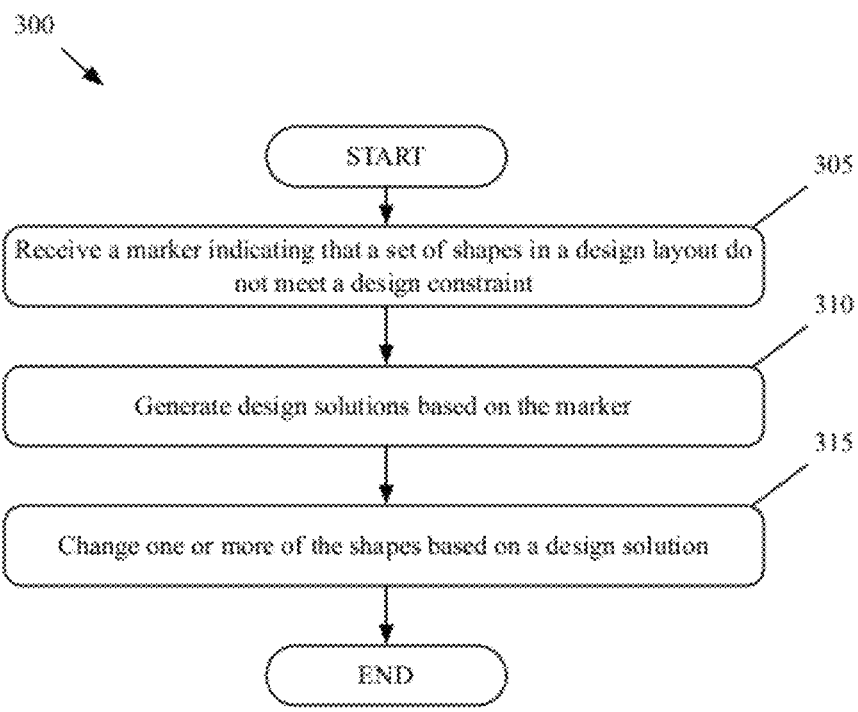
FIG. 3 conceptually illustrates a process that some embodiments use to generate design solutions and change a design layout.

The operation of the design solution generator 220 and the design modifier 250 will now be described by reference to FIG. 3. FIG. 3 conceptually illustrates a process 300 performed by some embodiments to generate design solutions and to use one of the solutions to remedy a design rule violation. In some embodiments, the process is performed by a software application that includes modules, such as the design solution generator 220 and the design modifier 250. In other embodiments, the process is performed by a computer system that is configured to execute such modules.

As shown in FIG. 3, process 300 receives (at 305) a marker that indicates a set of shapes in a design layout that do not meet a design constraint. FIG. 2 illustrates that the marker analyzer 230 retrieves from the marker repository 210 a marker that indicates a design rule violation committed by a set of shapes in a design layout. The marker analyzer 230 parses the marker and identifies the violated design rule and the marker coordinates. The marker analyzer 230 passes on the marker coordinates and the design layout information associated with the marker (e.g., the identification of the design layout and the identification of the layer on which the rule is violated, etc.) to the layout analyzer 225. The marker analyzer 230 also passes the identification of the design rule to the design constraint analyzer 235.

Next, process 300 generates (at 310) design solutions based on the marker. FIG. 2 illustrates that the design constraint analyzer 235 receives the identification of the violated design rule from the marker analyzer 230 and retrieves from the design constraints repository 215 the identified design rule. The design constraint analyzer 235 then identifies the type and the rule value of the rule and passes on the identified information to the solution generating module 240.

The layout analyzer 225, after receiving the marker and the design layout information associated with the marker, retrieves the design layout from the design layouts repository 205 and identifies a set of shapes that violates the design rule and the layer on which the rule is violated. The layout analyzer 225 then calculates a layout value of the set of shapes. The layout analyzer 225 passes the calculated layout value, the design layout, and the set of shapes to the solution generating module 240.

The solution generating module 240 receives the rule type and the rule value of the violated design rule from the design constraint analyzer 235 and the layout value, the design layout, and the violating set of shapes from the layout analyzer 225. The solution generating module 240 then calculates the difference between the rule value and the layout value. Based on the rule type which, for example, requires two shapes in the design layout to be separated by a minimum distance, the solution module 240 generates design solutions that remedy the design rule violation. One such solution suggests moving one of the two shapes that violates the minimum distance rule by the calculated distance so that the two shapes are separated by the minimum distance defined by the rule value. The solution generating module 240 deposits the generated design solutions in the design solutions repository 245.

Process 300 then changes (at 315) one or more of the shapes based on a design solution. In some embodiments, the process sequentially analyzes each of the generated design solutions to verify whether applying the solution results in any new design rule violations in the design layout. The process in some embodiments selects the first design solution that does not cause any new design violations. The process then changes the shapes according to the selected solution. In other embodiments, the process selects a solution that suggests changing the least number of shapes in the design layout from those design solutions that do not cause any new design rule violations.

FIG. 2 illustrates that the design modifier 250 retrieves all design solutions for the design violation from the design solutions repository 245 and examines each of the retrieved solutions against design constraints it retrieves from the design constraints repository 215 until a design solution that does not cause any new design rule violation is found. The design modifier 250 then selects such solution and modifies the layout by applying the selected solution to the design layout retrieved from the design layouts repository 205. The design modifier 250 deposits back the modified layout in the design layouts repository 205.

One of ordinary skill in the art will recognize that process 300 is a conceptual representation of the operations used to receive a marker, generate design solutions based on the marker, and change the shapes based on a generated design solution. The specific operations of process 300 may not be performed in the exact order shown and described. The specific operations may not be performed in one continuous series of operations, and different specific operations may be performed in different embodiments. Furthermore, the process could be implemented using several sub-processes, or as part of a larger macro process.

For instance, in some embodiments, process 300 is performed by one or more design software applications that are executing on one or more computers. Specifically, receiving a marker at 305 and generating design solutions at 310 may be performed by one design software application running on one computer and changing the shapes based on a design solution may be performed by another design software application running on the same or different computer.

Several more detailed embodiments of the invention are described in the sections below. Section I describes several examples of generating design solutions for different types of design rule violations. Next, Section II describes transformation of coordinates of a shape in a design layout. Section III follows this with a description of the software architecture of a computer system of some embodiments, a process performed by the computer system, and several data structures used in some embodiments. Finally, Section IV describes a computer system that implements some embodiments of the invention.

I. Examples of Generating Design Solutions

As mentioned above, there are many types of design rules. Each design rule imposes different requirements on the segments or shapes of a design layout. When the shapes do not meet these requirements, the shapes are deemed violating the design rules. Some of the types of design rule violations include a space violation, a width violation, an edge violation, and an area violation all of which will now be described in detail in the following sub-sections I.A-I.D.

A. Design Solution Generating Process and Space Violation

Figure 4:
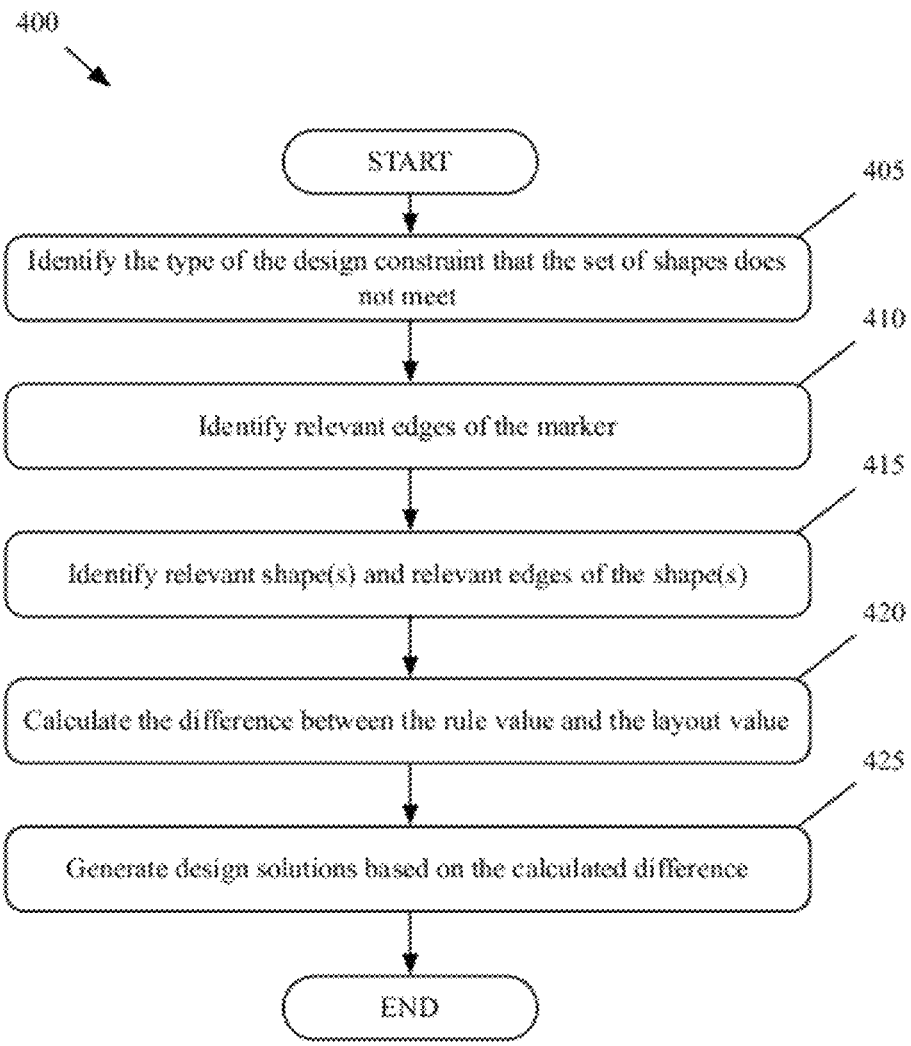
FIG. 4 conceptually illustrates a process that some embodiments use to generate design solutions.

FIG. 4 conceptually illustrates a process 400 that some embodiments perform to generate design solutions to a design rule violation in a design layout. The process 400 in some embodiments is performed by a design solution generating module such as the design solution generator 220 described above by reference to FIG. 2. The process in some embodiments starts when the process has received a marker that indicates that a set of shapes in a layer of a design layout violates a design rule. The process 400 will be described by reference to FIGS. 5, 6, and 7 which illustrate generating design solutions to a space violation.

As shown, process 400 identifies (at 405) from the received marker the type of the design constraint that a set of the segments or shapes of the design layout does not meet. Some of the types of design rule violations include a space violation, a width violation, an area violation, and an edge violation. A space violation is a violation of a design rule that requires that two shapes that are designed to be separated in a design layout be at least a certain distance apart from each other. A width violation is a violation of a design rule that requires a shape in a design layout to have at least a certain width. An area violation is a violation of a design rule that requires a shape to have at least a certain area or size in the IC design layout. An edge violation is a violation of a design rule that requires a set of shapes that form an inward edge (or, an inward corner) to have at least certain length along the portions of the shapes' edges that are forming the inward corner.

After the process identifies (at 405) the type of the design rule violation that the set of shapes committed, the process identifies (at 410) relevant edges of the marker when rendered as a geometric shape. The relevant edges of the marker are the edges that are to be used to identify relevant shapes of the design layout and relevant edges of the relevant shapes. As mentioned above, all edges of all shapes in a layer of a design layout are either perpendicular or parallel to one another. In these embodiments, the process identifies the edges of the marker that are orthogonal to the edges of the shapes in the design layout as the relevant edges of the marker. The process also optionally identifies a hint box that is defined as the largest rectangle that can fit within the marker. A hint box shares the relevant edges of the marker as some or all of the edges of the hint box. That is, some or all edges of the hint box coincide with the relevant edges of the marker. In some embodiments, instead of or in conjunction with using the marker, the process uses a hint box to identify the relevant shapes and the relevant edges of the relevant shapes.

Figure 5:
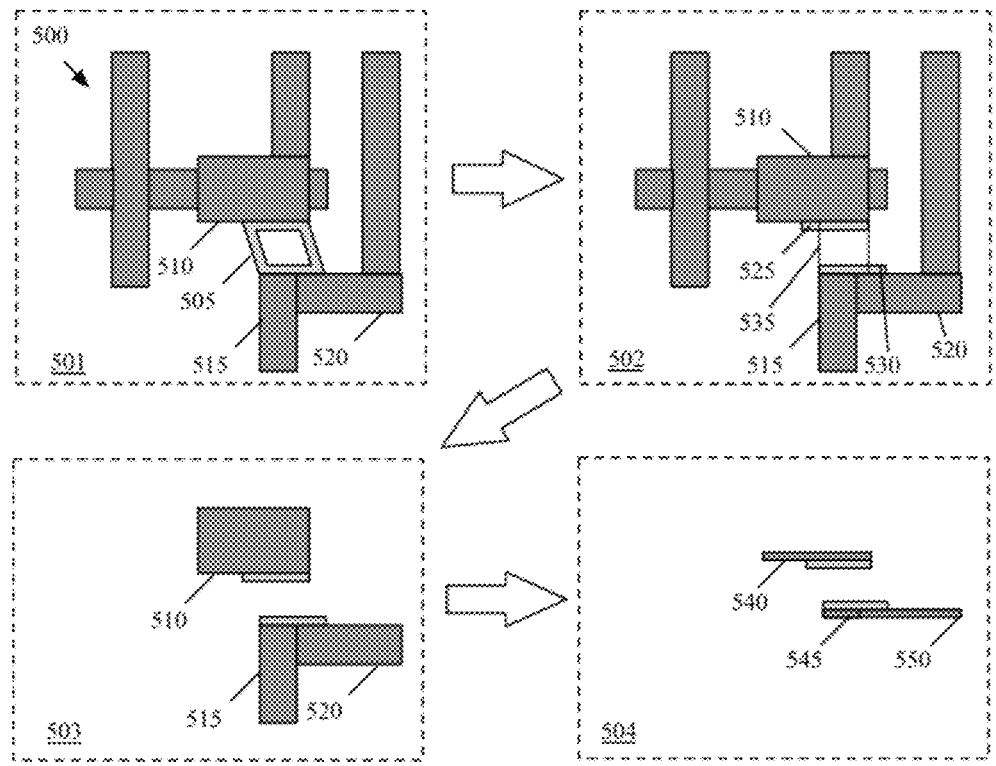
FIG. 5-7 illustrates generating and applying design solutions in some embodiments for a space violation.

FIG. 5 illustrates an example of a space violation committed by a set of shapes in a design layout 500. Specifically, the figure illustrates identifying relevant shapes, relevant edges of the relevant shapes, and relevant edges of a marker 505 that indicates the space violation in four stages 501-504. FIG. 5 illustrates a marker 505, three shapes 510-520, and other shapes of the design layout 500. The design layout 500 may include more markers and shapes which are not illustrated in FIG. 5 for simplicity.

In some embodiments, the marker 505, by having two orthogonal edges and two diagonal side edges as illustrated in stage 501, indicates that the distance between the bottom edge of the shape 510 and the top edges of the shapes 515 and 520 is shorter than a minimum distance required by a design constraint. As illustrated in stage 502, the relevant edges of the marker 505 are the top edge 525 and the bottom edge 530 because they are orthogonal to the edges of the shapes in the design layout 500. Also illustrated in stage 502 is a hint box 535 which has top and bottom edges that overlap portions of the top and bottom edges of the marker 505.

Returning to FIG. 4, process 400 identifies (at 415) any relevant shapes of the design layout and relevant edges of the shapes identified as the relevant shapes. In some embodiments, the relevant shapes are the shapes of the design layout that abut the relevant edges of the marker. That is, the relevant shapes are the shapes with some edges that share at least a portion of the relevant edges of the marker. Alternatively, the relevant shapes are the shapes that abut the hint box if the process identifies and uses the hint box. The process identifies those edges of the relevant shapes that abut the relevant edges of the marker or the hint box as the relevant edges of the relevant shapes.

A design solution to the design violation in some embodiments suggests moving one or more relevant edges of one or more relevant shapes by certain distances in certain directions. Moving a relevant edge of a relevant shape in some embodiments entails (1) moving the relevant shape in order to move the relevant edge, (2) reducing the size of the relevant shape by moving the relevant edge towards the center of the relevant shape, or (3) enlarging the size of the relevant shape by moving the relevant edge away from the center of the relevant shape.

As illustrated in stage 503 of FIG. 5, the shapes 510, 515, and 520 are identified as the relevant shapes because they abut the relevant edges 525 and 530 of the marker 505. Stage 504 shows that the edges 540, 545 and 550 of the shapes 510, 515, and 520, respectively, are the relevant edges. These relevant edges of the shapes and the marker are rendered in this figure as thin rectangular bars that have widths and lengths in order to visualize the abutting of these relevant edges in the figure. However, these relevant edges are lines that do not have widths in some embodiments.

Next, process 400 calculates (at 420) the difference between the rule value and the layout value. A rule value of the design rule is the value of the requirement imposed by the design rule. For instance, for a space violation, the rule value is a minimum distance by which two shapes in a design layout are required to be separated. The rule value for a width violation is a minimum width that a shape in a design layout is required to have. For an area violation, the rule value is the minimum area that a shape in the design layout is required to have. The rule value for an edge violation is a minimum length that the portions of the edges of a set of shapes that form an inward corner in a design layout must have.

A layout value in some embodiments is a value of a particular geometric attribute of a set of relevant shapes that violates a particular design rule. For instance, for a space violation, the layout value is defined by the distance between two relevant shapes in the set. For a width violation, the layout value is the width of a relevant shape in the design layout. The layout value for an area violation is the area or size of a relevant shape in the design layout. The layout value for an edge violation is the length of the edges that form an inward corner that is formed by a set of relevant shapes in the design layout.

Process 400 calculates the difference between the rule value of the violated design rule and the layout value of the relevant shapes that violate the design rule by subtracting the layout value from the rule value.

The process then generates (at 425) several design solutions based on the calculated difference between the layout value and the rule value. For a space violation, when there are two relevant edges that violate the design rule, the two relevant edges of the two relevant shapes that are separated by a distance defined by the layout value need to be separated further away from each other in order to meet the design rule that the two relevant shapes violate. In some embodiments, the process generates three design solutions: (1) a solution that suggests moving a first edge of the two relevant edges away from a second relevant edge by a distance defined by the calculated difference, (2) a solution that suggests moving the second relevant edge away from the first relevant edge by a distance defined by the calculated difference, and (3) a solution that suggests moving both the first and second relevant edges away from each other such that the total distance between the two edges after moving them is at least a distance defined by the rule value (e.g., moving the first and second edges by one half of calculated difference each away from each other). Solutions to other types of design rule violations will be described further below by reference to FIGS. 8-16.

One of ordinary skill in the art will recognize that process 400 is a conceptual representation of the operations used to generate design solutions based on a received marker. The specific operations of process 400 may not be performed in the exact order shown and described. The specific operations may not be performed in one continuous series of operations, and different specific operations may be performed in different embodiments. Furthermore, the process could be implemented using several sub-processes, or as part of a larger macro process.

Figure 6:
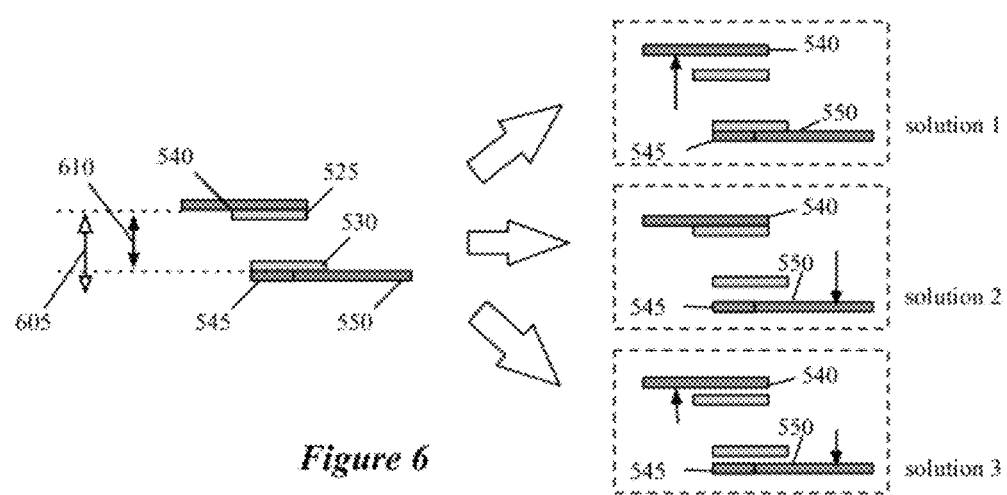

FIG. 6 illustrates three example design solutions to the space violation committed by the shapes 510, 515, and 520 described above by reference to FIG. 5. FIG. 6 illustrates the design solutions with the relevant edges 525 and 530 of the shapes 510, 515, and 520 and with the relevant edges 525 and 535 of the marker 505. The rule value of the space violation committed by the relevant shapes 510-520 is depicted as a bidirectional arrow 605. The layout value of the relevant shapes 510-520 are depicted as a bidirectional arrow 610. In these examples, the rule value is 0.070 units and the layout value is 0.065 units. The difference between the rule value and the layout value is 0.005 units, i.e., the distance between the shape 510 and the shapes 515 and 520 is 0.005 units short of the required minimum distance. A "unit" is a unit of a length (e.g., millimeter, micrometer, nanometer, etc.) in some embodiments.

As shown in FIG. 6, solution 1 to the space violation suggests moving the relevant edge 540 of the relevant shape 510 upwards (i.e., away from the relevant edges 545 and 550) by a distance (0.005 units in this example) defined by the difference between the layout value and the rule value. Solution 2 suggests moving the relevant edges 545 and 550 downwards (e.g., away from the relevant edge 540) by a distance defined by the difference between the layout value and the rule value. Solution 3 suggests moving the relevant edge 540 upwards by half a distance (e.g., 0.0025 units) defined by the difference between the layout value and the rule value and moving the relevant edges 545 and 550 downwards by the other half (e.g., 0.0025 units). As such, each of the three solutions, when applied to the shapes, causes the relevant shapes to meet the design rule that the shapes violate.

Figure 7:
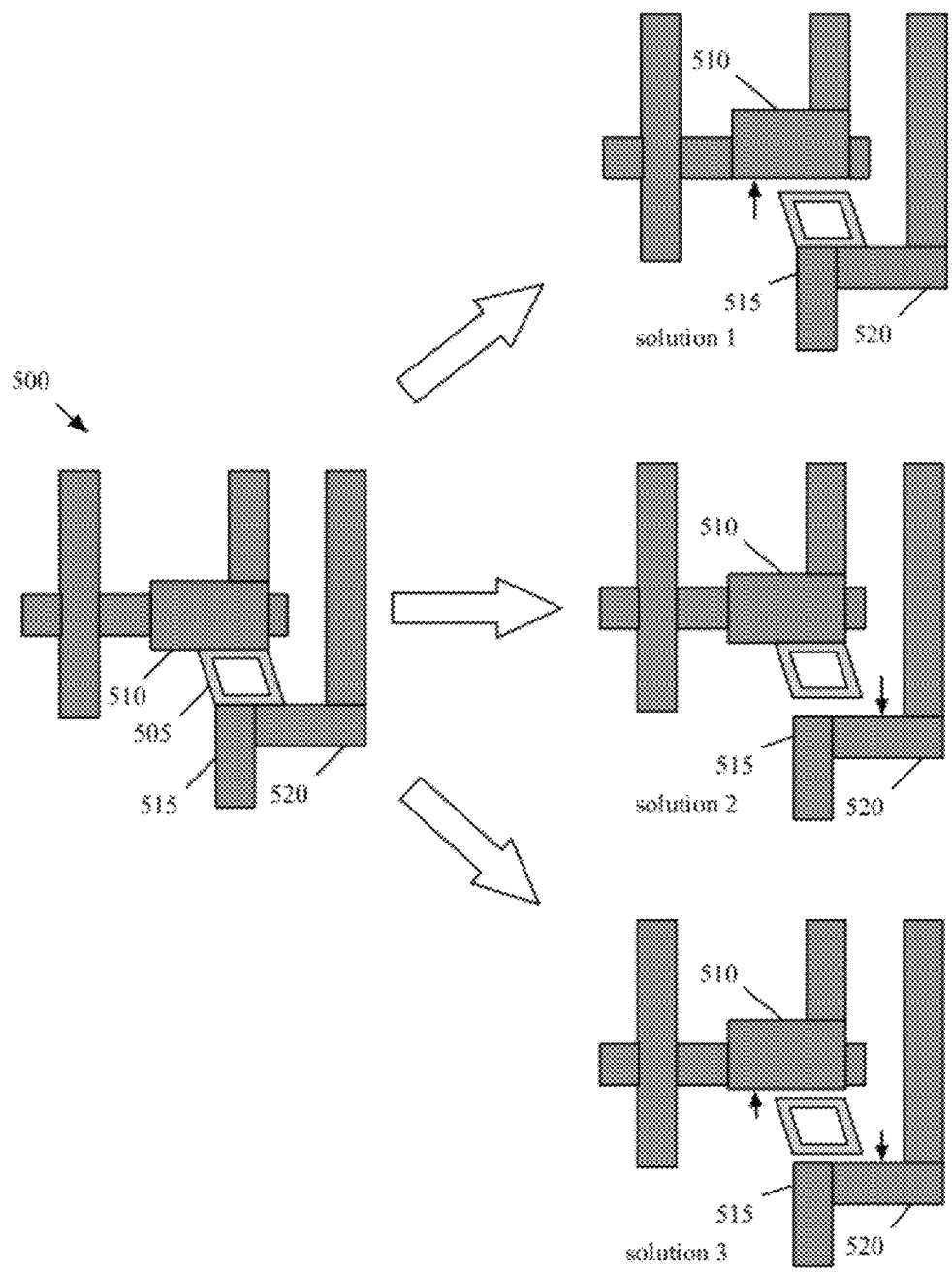

FIG. 7 illustrates examples of the design layout 500 when the three design solutions illustrated in FIG. 6 are applied to the shapes in the layout 500. In contrast to FIG. 6 in which the solutions are illustrated with the edges, FIG. 7 illustrates with the shapes how the design layout 500 would be rendered when the solutions are applied to the design layout 500.

As shown in FIG. 7, solution 1, when applied to the layout 500, moves the shape 510 upwards (i.e., away from the shapes 515 and 520) by a distance defined by the difference between the rule value and the layout value in some embodiments. Different embodiments apply the same design solution differently. For instance, solution 1 in some embodiments is applied by reducing the size of the shape 510 by moving the bottom edge (i.e., the relevant edge 540) upward by a distance defined by the difference between the rule value and the layout value without moving the three other edges of the shape 510. In such example, each of the two side edges of the shape 510 is shortened by the length defined by the difference.

Solution 2 moves the shapes 515 and 520 downwards (i.e., away from the shape 510) by a distance defined by the difference when applied to the shapes. Solution 3 moves the shape 510 upwards by a distance defined by one half of the difference and moves the shapes 515 and 520 downwards by a distance defined by the other half of the difference when applied to the shapes. Different embodiments apply solution 3 differently by using different combinations of distances by which the relevant edges move. For instance, the shape 510 is moved upwards by a distance defined by a quarter of the difference between the rule value and the layout value and the shapes 515 and 520 are moved downwards by a distance defined by three quarters of the difference. Many other combinations of moving the relevant shapes are possible as long as the distance between the relevant shapes after moving the shapes is at least a distance defined by the rule value.

B. Width Violation

Figure 8:
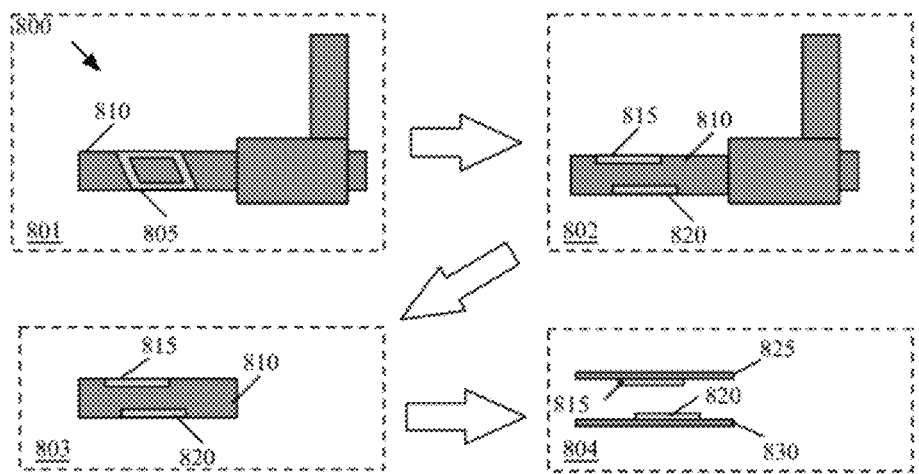
FIG. 8-10 illustrates generating and applying design solutions in some embodiments for a width violation.

FIG. 8 illustrates an example of a width violation committed by a shape 810 in a design layout 800. Specifically, FIG. 8 illustrates identifying a relevant shape, relevant edges of the relevant shape, and relevant edges of a marker 805 that indicates the width violation in four stages 801-804. FIG. 8 illustrates that the layout 800 includes the shape 810 and other shapes. For simplicity, additional shapes and markers that could be on the design layout 800 are not illustrated in FIG. 8.

As shown in stage 801, the marker 805, by having two orthogonal edges and two diagonal side edges, indicates that the width of the shape 810 (e.g., the distance between the top and the bottom edges of the shape 810) is shorter than a minimum width required by a design constraint in some embodiments.

In stage 802, the relevant edges of the marker 805 are identified. As mentioned above, all edges of all shapes in a layer of a design layout are either perpendicular or parallel to one another. The relevant edges of the marker are the edges that are orthogonal to the edges of the shapes in the design layout. Since the top and bottom edges 815 and 820 are orthogonal to the edges of shapes of the layout 800, these are the relevant edges of the marker 805 which are used in some embodiments to identify a set of relevant shapes and the relevant edges of the set of relevant shapes.

In stage 803, a relevant shape of the layout 800 is identified. As mentioned above, relevant shapes are the shapes that abut the relevant edges of the marker in some embodiments. The shape 810 is identified as the relevant shape that commits the width violation because the top and bottom edges of the shape 810 abut the relevant edges 815 and 820 of the marker 805. The relevant shape is the shape to be changed when a solution to the width violation is applied to the layout 800.

In stage 804, the relevant edges of the identified relevant shape 810 are identified. As mentioned above, the relevant edges of the relevant shapes are the edges of the relevant shapes that abut the relevant edges of the marker that indicates the design rule violation in some embodiments. The top and bottom edges 825 and 830 of the relevant shape 810 are identified as the relevant edges which will be moved when a solution to the width violation is applied to the shape 810.

Figure 9:
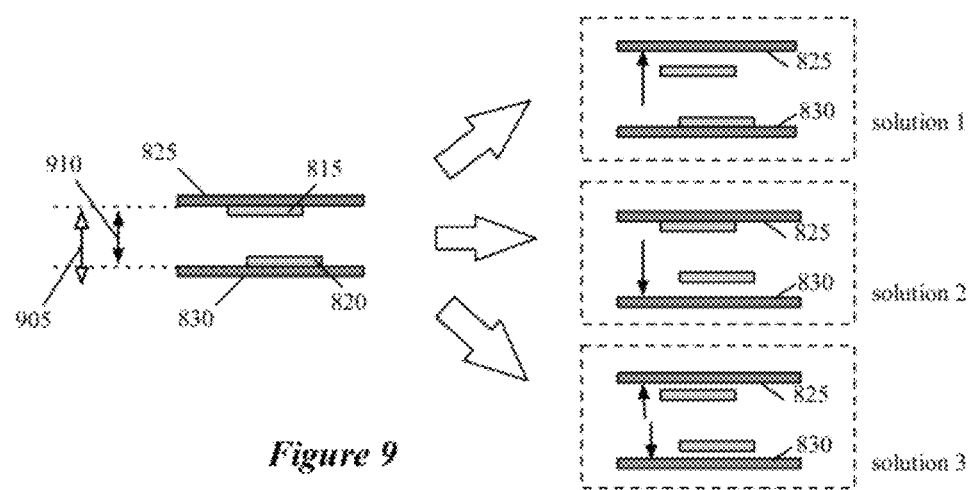

FIG. 9 illustrates three example design solutions in some embodiments to the width violation committed by the shape 810 described above by reference to FIG. 8. The figure illustrates solutions 1-3 with the relevant edges 825 and 830 of the shape 810 (not shown in this figure). The rule value of the width violation committed by the relevant shape 810 is depicted as a bidirectional arrow 905. The layout value of the relevant shape 810 is depicted as a bidirectional arrow 910.

As mentioned above, the rule value for a width violation is a minimum width that a shape in a design layout is required to have. The layout value for a width violation is the width of a relevant shape (i.e., a shape that violates the design rule) of the design layout. As shown, the layout value of the relevant shape 810 (not shown in this figure) is shorter than the rule value and thus the width of the relevant edge should be adjusted to meet the required rule value. In these examples, the rule value is 0.070 units and the layout value is 0.065 units. The difference between the rule value and the layout value is 0.005 units, i.e., the width of the shape 810 is 0.005 units short of the required minimum width.

As shown, solution 1 suggests increasing the width of the shape 810 by moving the upper edge 825 of the shape 810 upwards away from the bottom edge 830 by a length (e.g., 0.005 units) defined by the difference between the rule vale and the layout value. Solution 2 to the width violation suggests moving the bottom edge 830 of the shape 810 downwards (i.e., away from the top edge 825) by a length (0.005 units in this example) defined by the difference. Solution 3 suggests moving the upper edge 825 upwards by a length defined by one half (e.g., 0.0025 units) of the difference and moving the bottom edge 830 by a length defined by the other half (e.g., 0.025 units) of the difference. Similar to solution 3 for the space violation described above by reference to FIG. 6, many other combinations of distances are possible for moving the relevant edges as long as the adjusted width of the shape 810 is at least the minimum width defined by the rule value. For instance, a solution may suggest moving the upper edge 825 upwards by a fifth (e.g., 0.001 units) of the difference and moving the bottom edge 830 downwards by a four-fifths (e.g., 0.004 units) of the difference.

Figure 10:
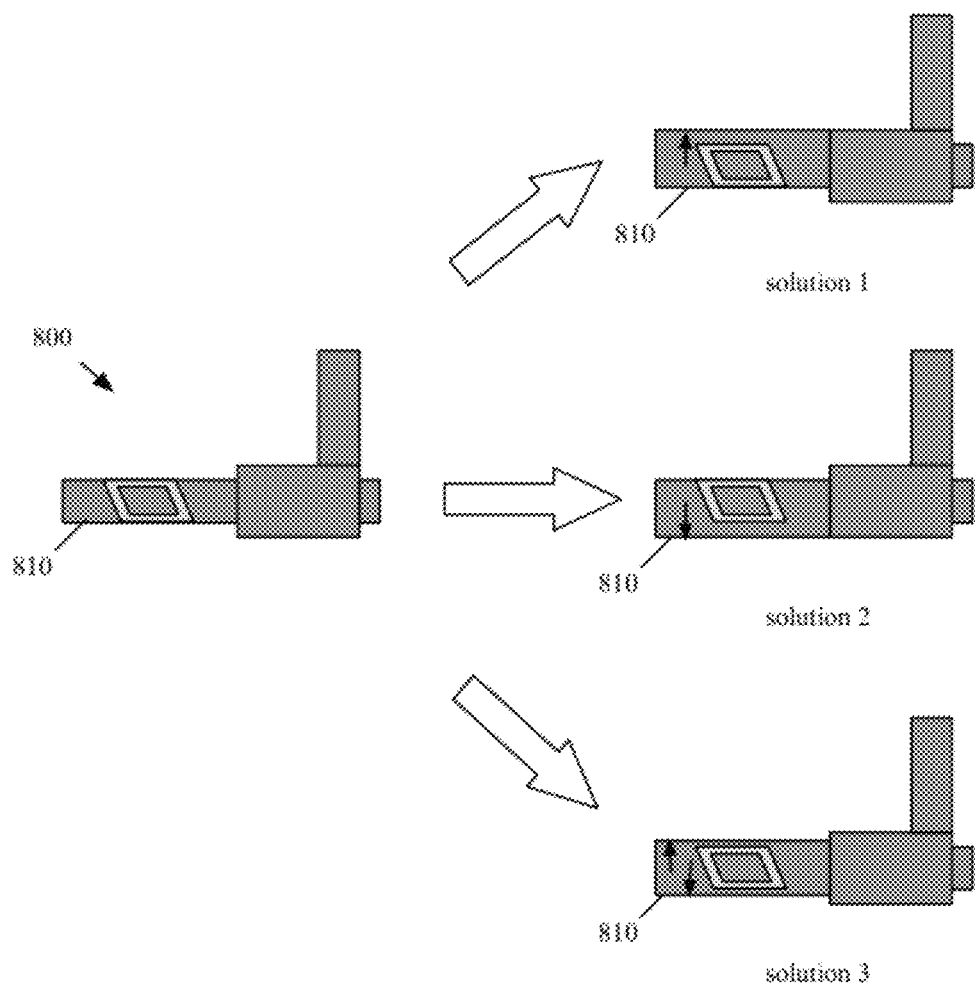

FIG. 10 illustrates examples of the design layout 800 when each of these three solutions to the width violation committed by the shape 810 is applied to the layout. Unlike the design solutions to a space violation, the design solutions to a width violation in some embodiments do not entail moving the relevant shapes by certain distances.

As shown, solution 1 moves the upper edge of the relevant shape 810 in order to increase the width of the shape 810 to the width defined by the rule value for the width violation. As a result, the side edges of the shape 810 are elongated by the same length as the length the width of the shape 810 is increased by. The size of the shape also increases accordingly.

Solution 2 moves the bottom edge of the shape downwards by a length defined by the difference between the rule value and the layout value when applied to the layout 800. Solution 3 moves the upper edge upwards and the bottom edge downwards such that the width of the shape 810 becomes equal to the width defined by the rule value.

C. Area Violation

Figure 11:
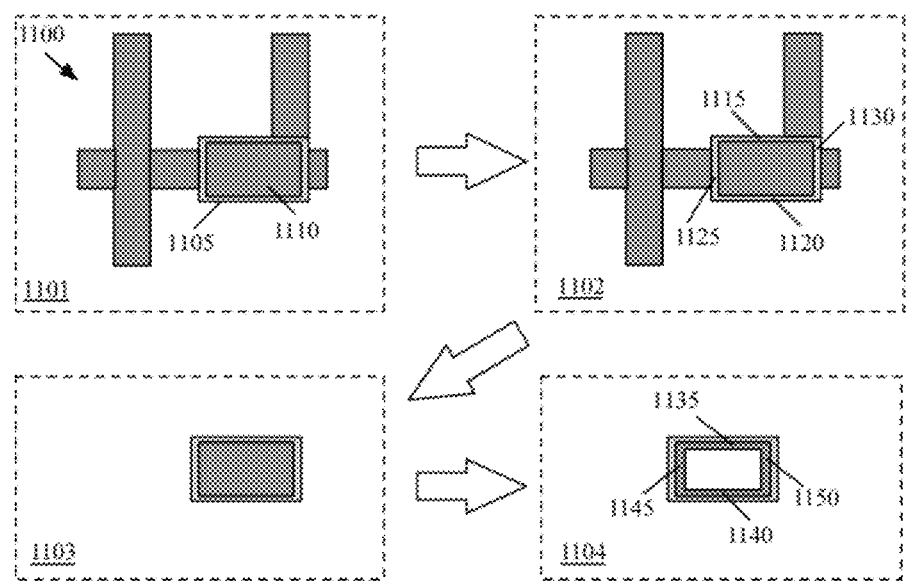
FIG. 11-13 illustrates generating and applying design solutions in some embodiments for an area violation.

FIG. 11 illustrates an example of an area violation committed by a shape 1110 in a design layout 1100. Specifically, FIG. 11 illustrates identifying a relevant shape, relevant edges of the relevant shape, and relevant edges of a marker 1105 that indicates the area violation in four stages 1101-1104. FIG. 11 illustrates that the layout 1100 includes the shape 1110 and other shapes. For simplicity, additional shapes and markers that could be on the design layout 800 are not illustrated in FIG. 11.

As shown in stage 1101, all four edges of the marker 1105 are orthogonal to the edges of the shapes of the layout and are coincidental to the edges of the shape 1110. Such a marker in some embodiment indicates that the area or the size of the shape 1110 is smaller than a minimum area or size that a design constraint requires a shape in a design layout to have. Although the marker 1105 is depicted as a hollow rectangle that encloses the shape 1110 in stage 1101, the edges of the marker 1105 are coincidental to the edges of the shape 1110. That is, the marker 1105 and the shape 1110 have the same geometric shape and the vertexes of the marker and the shape have the same coordinates.

In stage 1102, the relevant edges of the marker 1105 are identified. As mentioned above, the relevant edges of the marker are the edges that are orthogonal to the edges of the shapes in the design layout. Because all four edges 1115-1130 are orthogonal to the edges of the shapes of the layout 1100, they are the relevant edges of the marker 1105 which are used to identify a set of relevant shapes and the relevant edges of the set of relevant shapes.

In stage 1103, the relevant shape of the layout 1100 is identified. As mentioned above, the relevant shapes are the shapes that abut the relevant edges of the marker. The shape 1110 is identified as the relevant shape that commits the area violation because all four edges of the shape 1110 abut the relevant edges 1115-1130 of the marker 1105. A relevant shape is the shape to be changed when a solution to the area violation is applied to the layout 1100.

In stage 1104, the relevant edges of the identified relevant shape 1110 are identified. As mentioned above, the relevant edges of the relevant shapes are the edges of the relevant shapes that abut the relevant edges of the marker that indicates the design rule violation in some embodiments. All four edges 1135-1150 of the relevant shape 1110 are identified as the relevant edges which will be moved when a solution to the area violation is applied to the shape 1110. The relevant edges of the shape 1110 are coincidental to the edges of the marker 1105 although the shape 1110 is depicted as a hollow rectangle within the marker 1105 in order to make the edges of the shape 1110 visible in the figure.

Figure 12:
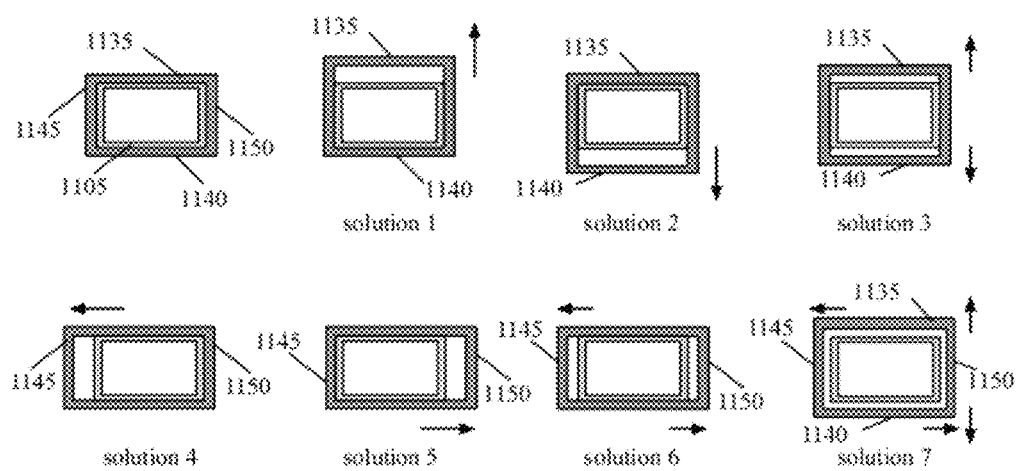

FIG. 12 illustrates seven example design solutions to the area violation committed by the shape 1110 described above by reference to FIG. 11. The figure illustrates solutions 1-7 with the relevant edges 1135-1150 of the relevant shape 1110 (not shown in this figure).

As mentioned above, the rule value for an area violation is a minimum area or size that a shape in a design layout is required to have. The layout value for an area violation is the area or size of a relevant shape (i.e., a shape that violates the design rule) of the design layout. The layout value of the relevant shape 1110 (not shown in this figure) is smaller than the rule value and thus the area of the relevant edge should be adjusted to meet the required rule value. In these examples, the rule value is 0.027 square units and the layout value is 0.0189 square units (with a length of 0.270 units and a height of 0.070 units). The difference between the rule value and the layout value is 0.0081 square units, i.e., the area or size of the shape 1110 is 0.0081 square units smaller than the required minimum size.

As shown in FIG. 12, solution 1 suggests increasing the area of the shape 1110 to the area defined by the rule value by moving the upper edge 1135 of the shape 1110 upwards (i.e., away from the bottom edge 1140) by a certain length. Such length can be calculated by solving an algebraic equation for calculating an area of a rectangle in some embodiments. For instance, solution 1 calculates the length (e.g., 0.030 unit) by dividing the area (e.g., 0.0081 square units) defined by the difference between the rule value and the layout value by the length of the upper edge 1135 (i.e., the current width of the shape 1110, e.g., 0.270 units).

Solution 2 suggests moving the bottom edge 1140 of the shape 1110 downwards (i.e., away from the top edge 1135) by the same length (i.e., 0.030 units) by which solution 1 suggests moving the upper edge 1135 upwards. As such, the area of the shape 1110 after applying solution 2 to the shape will be the area defined by the rule value. Solution 3 suggests moving the upper edge 1135 upwards by one half (e.g., 0.015 units) of the length by which solution 1 suggests moving the upper edge 1135 and moving the bottom edge 1140 by the other half (e.g., 0.015 units). Many other combinations of distances for moving the upper and bottom edges are possible as long as the adjusted length of the side edge 1145 increases the current area of the shape 1110 to an area equal to the area defined by the rule value.

Solution 4 suggests increasing the area of the shape 1110 to the area defined by the rule value by moving the left edge 1145 of the shape 1110 to the left (i.e., away from the right edge 1150) by a certain length. This length can also be calculated by solving an algebraic equation for calculating an area of a rectangle. For instance, some embodiments calculate the length (e.g., 0.1155 units) to move the left edge by dividing the area (e.g., 0.0081 square units) defined by the difference between the rule vale and the layout value by the current length (e.g., 0.070 units) of the left edge 1145.

Solution 5 suggests moving the right edge 1150 of the shape 1110 to the right (i.e., away from the left edge 1145) by the same length (e.g., 0.1155 units) by which solution 4 suggests moving the left edge 1145 to the left. As such, the area of the shape 1110 after applying solution 5 to the shape 1110 will be the area defined by the rule value. Solution 6 suggests moving the left edge 1145 to the left by one half (e.g., 0.0575 units) of the length by which solution 4 suggests moving the left edge 1145 to the left and moving the right edge 1150 by the other half (e.g., 0.0575 units) of the length. Many other combinations of distances for moving the left and right edges are possible as long as the adjusted length of the upper edge 1135 increases the area of the shape 1110 to an area equal to the area defined by the rule value.

Solution 7 suggests moving all four edges 1135-1150 of the shape 1110 away from the center of the shape 1110 such that the area of the shape 1110 after applying solution 7 is equal to the area defined by the rule value. Many combinations of lengths for moving the edges are possible and these lengths can be calculated by solving an algebraic equation for calculating an area of a rectangle. In some embodiments, solution 7 has two parts. The first part of solution 7 suggests moving each of the left and right edges 1145 and 1150 away from the center of the shape 1110 by a length (e.g., 0.030 units) less than one half (e.g., 0.0575 units) of the length (e.g., 0.1155 units) by which solution 4 suggests moving the left edge 1145. The resulting area of the shape 1110 is increased by an area (e.g., 0.0042 square units) calculated by multiplying the current height (e.g., 0.070 units) by the length (e.g., 0.060 units) by which the width is increased.

The second part of solution 7 then suggests moving each of the upper edge 1135 and the bottom edge 1140 away from the center of the shape 1110 such that the final area of the shape 1110 is increased by the area (e.g., 0.0081 square units) defined by the difference between the rule value (e.g., 0.0271 square units) and the layout value (e.g., 0.0189 square units). Since the area of the shape 1110 is increased by applying the first part of the solution, the second part suggests moving each of the upper edge 1135 and the bottom edge 1140 away from the center of the shape 1110 by one half (e.g., 0.0059 units) of the length (e.g., 0.0118 units) calculated by dividing the remaining area (e.g., 0.0039 square units) by the adjusted length (i.e., 0.330 units) of the upper edge 1135 (i.e., the adjusted width, e.g., 0.330 units, of the shape 1110 after applying the first part of the solution).

Figure 13:
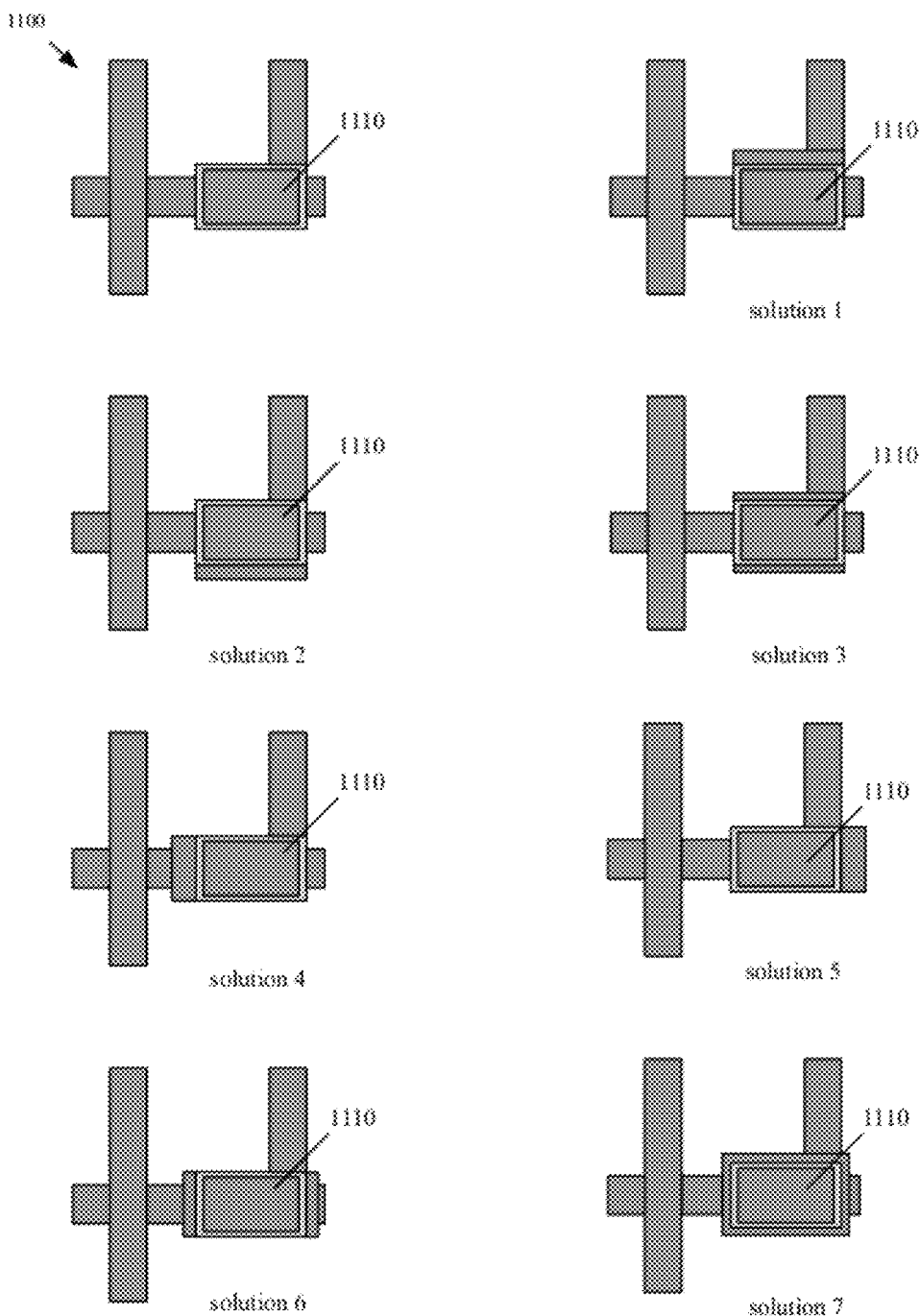

FIG. 13 illustrates examples of the design layout 1100 when each of these seven solutions to the area violation committed by the shape 1110 is applied to the layout. Like the solutions to a width violation, the solutions to an area violation in some embodiments do not entail moving the relevant shapes by certain distances. Instead, the solutions to an area violation suggest enlarging the relevant shape by moving a set of relevant edges.

As shown, solution 1 moves the upper edge of the relevant shape 1110 upwards by the calculated length as described above by reference to FIG. 12 in order to increase the area of the shape 1110 to an area defined by the rule value for the area violation. Solution 2 moves the bottom edge of the shape downwards by the same length by which solution 1 moves the upper edge upwards. Solution 3 moves both the upper and bottom edges away from the center of the shape 1110. The shape 1110 after applying solutions 1, 2, or 3 has the same dimension but occupies different locations in the layer of the design layout. That is, the shape after having been applied one of solutions 1-3 has different coordinates in the layer of the design layout.

Solution 4 moves the left edge of the relevant shape 1110 to the left by the calculated length as described above by reference to FIG. 12. Solution 5 moves the right edge of the relevant shape 1110 to the right by the same length by which solution 4 moves the left edge. Solution 6 moves both the left and right edges away from the center of the shape 1110. The shape 1110 after applying solutions 4, 5, or 6 has the same dimension but occupies different location of the layer of the design layout. Solution 7 moves all four edges of the shape 1110 away from the center of the shape by certain calculated distances as described above by reference to FIG. 12.

D. Edge Violation

Figure 14:
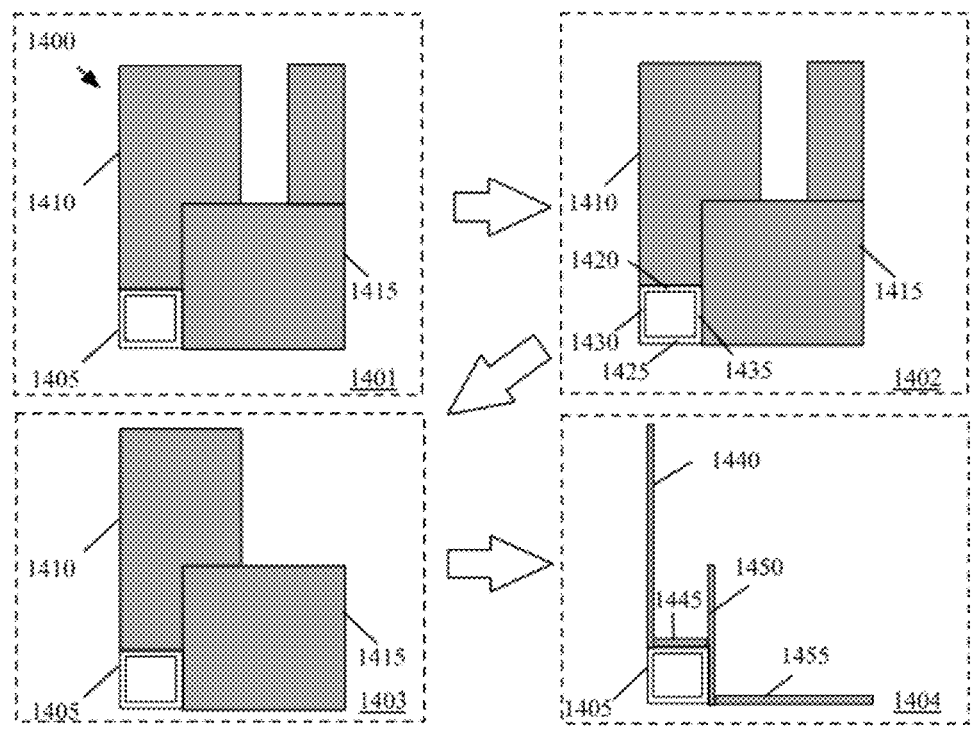
FIG. 14-16 illustrates generating and applying design solutions in some embodiments for an edge violation.

FIG. 14 illustrates an example of an edge violation committed by shapes 1410 and 1415 in a design layout 1400. Specifically, FIG. 14 illustrates identifying relevant shapes, relevant edges of the relevant shapes, and relevant edges of a marker 1405 that indicates the edge violation in four stages 1401-1404 in some embodiments. FIG. 14 illustrates that the layout 1400 includes shapes 1410 and 1415 and another shape. For simplicity, additional shapes and markers that could be on the design layout 1400 are not illustrated in FIG. 14.

As shown in stage 1401, the marker 1405 occupies an inward corner formed by shapes 1410 and 1415. Such a marker in some embodiment indicates that the total length of the portions of the edges that form the inward corner is smaller than a length that a design constraint requires an inward corner in a design layout to have along the edges of the corner.

In stage 1402, the relevant edges of the marker 1405 are identified. As mentioned above, all edges of all shapes in a layer of a design layout are either perpendicular or parallel to one another. The relevant edges of the marker are the edges that are orthogonal to the edges of the shapes in the design layout in some embodiments. Because all four edges 1420-1435 are orthogonal to the edges of the shapes of the layout 1400, they are the relevant edges of the marker 1405 which are used to identify a set of relevant shapes and the relevant edges of the set of shapes.

In stage 1403, the relevant shape of the layout 1400 is identified. As mentioned above, the relevant shapes are the shapes that abut the relevant edges of the marker. The shapes 1410 and 1415 are identified as the relevant shapes that commit the edge violation because portions of the bottom edge of the shape 1410 and the left edge of the shape 1415 abut the relevant edges 1420 and 1435 of the marker 1405, respectively. Relevant shapes are shapes to be changed when a solution to the edge violation is applied to the layout 1400.

In stage 1404, the relevant edges of the identified relevant shapes 1410 and 1415 are identified. As mentioned above, the relevant edges of the relevant shapes are the edges of the relevant shapes that abut the relevant edges of the marker that indicates the design rule violation. The left edge 1440 of the shape 1410 is identified as a relevant edge because the left edge 1440 abuts the left edge 1430 of the marker 1405 (i.e., because the bottom end of the left edge 1440 of the shape 1410 and the top end of the left edge 1430 of the marker 1405 overlap). The bottom edge 1445 of the shape 1410 and the left edge 1450 of the shape 1415 are also identified as relevant edges because the bottom edge 1445 and the left edge 1450 abut the top edge 1420 and the right edge 1435 of the marker 1405, respectively. The bottom edge 1455 of the shape 1415 is identified as a relevant edge because it abuts the bottom edge 1425 of the marker 1405.

Figure 15:
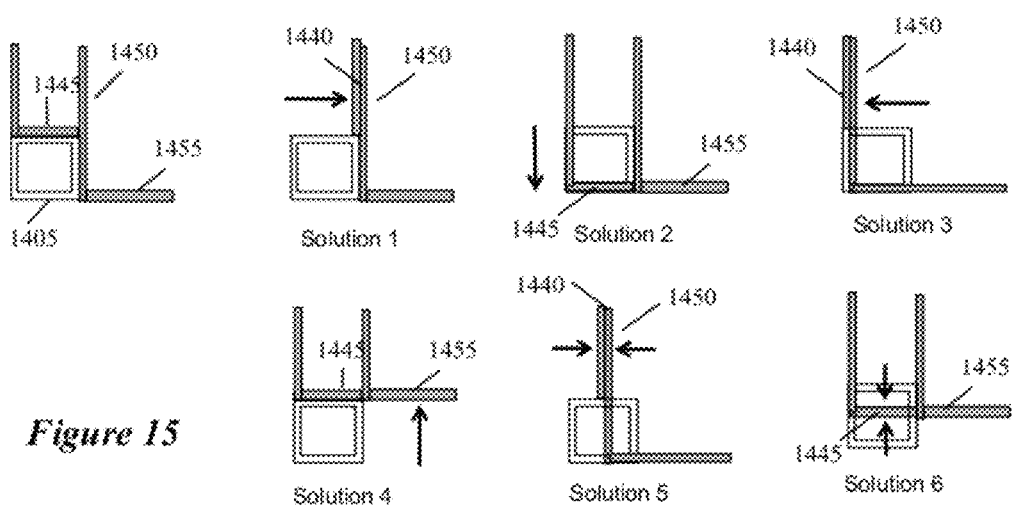

FIG. 15 illustrates six example design solutions to the edge violation committed by the shapes 1410 and 1415 described above by reference to FIG. 14. FIG. 15 illustrates solutions 1-6 with the relevant edges 1440-1455 of the relevant shapes 1410 and 1415 (not shown in this figure).

As mentioned above, the rule value for an edge violation in some embodiments is the minimum length of the edges of a set of shapes that form an inward corner in a design layout. The layout value for an edge violation is the length of the portions of the edges of the set of shapes that form the corner. When the layout value is smaller than the rule value, design solutions to remedy an edge violation in some embodiments suggest moving the relevant edges such that the inward corner formed by the relevant shapes is removed (i.e., such that the relevant shapes no longer form that inward corner).

For instance, solution 1 suggests moving the left edge 1440 of the shape 1410 to the right by the length of the upper edge 1420 of the marker 1405. When solution 1 is applied to the layout 1400, the left edge 1440 will partially coincide with the left edge 1450 of the shape 1415 and thereby eliminating the inward corner formed by the bottom edge 1445 of the shape 1410 and the left edge 1450 of the shape 1415.

Solution 2 suggests moving the bottom edge 1445 of the shape 1410 downwards by the length of the left edge 1430 of the marker 1405 (i.e., by the vertical length of the inward corner) such that the bottom edge 1445 coincides with the bottom edge 1455 of the shape 1415. Solution 3 suggests moving the left edge 1450 of the shape 1415 to the left by the length of the upper edge 1420 of the marker 1420 such that the left edge 1450 of the shape 1415 coincides with the left edge 1440 of the shape 1410. Solution 4 suggests moving the bottom edge 1455 of the shape 1415 upwards by the length of the left edge 1430 of the marker 1405 such that the bottom edge 1455 of the shape 1415 coincides with the bottom edge 1445 of the shape 1410. As such, solutions 1-4 to the edge violation suggest moving one of the relevant edges in order to remove the inward corner formed by the relevant shapes 1410 and 1415.

Solution 5 suggests moving the left edge 1440 of the shape 1410 to the right (i.e., towards the left edge 1450 of the shape 1415) and moving the left edge 1450 of the shape 1415 to the left (i.e., towards the left edge 1440 of the shape 1410) such that the two edges meet and coincide with each other. Many combinations of distances for moving these two edges are possible. For instance, the left edge 1440 of the shape 1410 is moved to the right by half the length of the upper edge 1420 of the marker 1405 (i.e., by the half the width of the inward corner) and the left edge 1450 of the shape 1415 is moved to the left by half the length of the upper edge 1420.

Solution 6 suggests moving the bottom edge 1445 of the shape 1410 downwards and moving the bottom edge 1455 of the shape 1415 upwards such that the two edges meet and coincide with each other. Like solution 5, many combinations of distances for moving these two bottom edges are possible. For instance, the bottom edge 1445 of the shape 1410 is moved downwards by half the length of the left edge 1430 of the marker 1405 (i.e., by half the height of the inward corner) and the bottom edge 1455 of the shape 1415 is moved upwards by half the length of the left edge 1430. As such, solutions 5-6 to the edge violation suggest moving a pair of the relevant edges toward each other to remove the inward corned formed by the relevant shapes.

Figure 16:
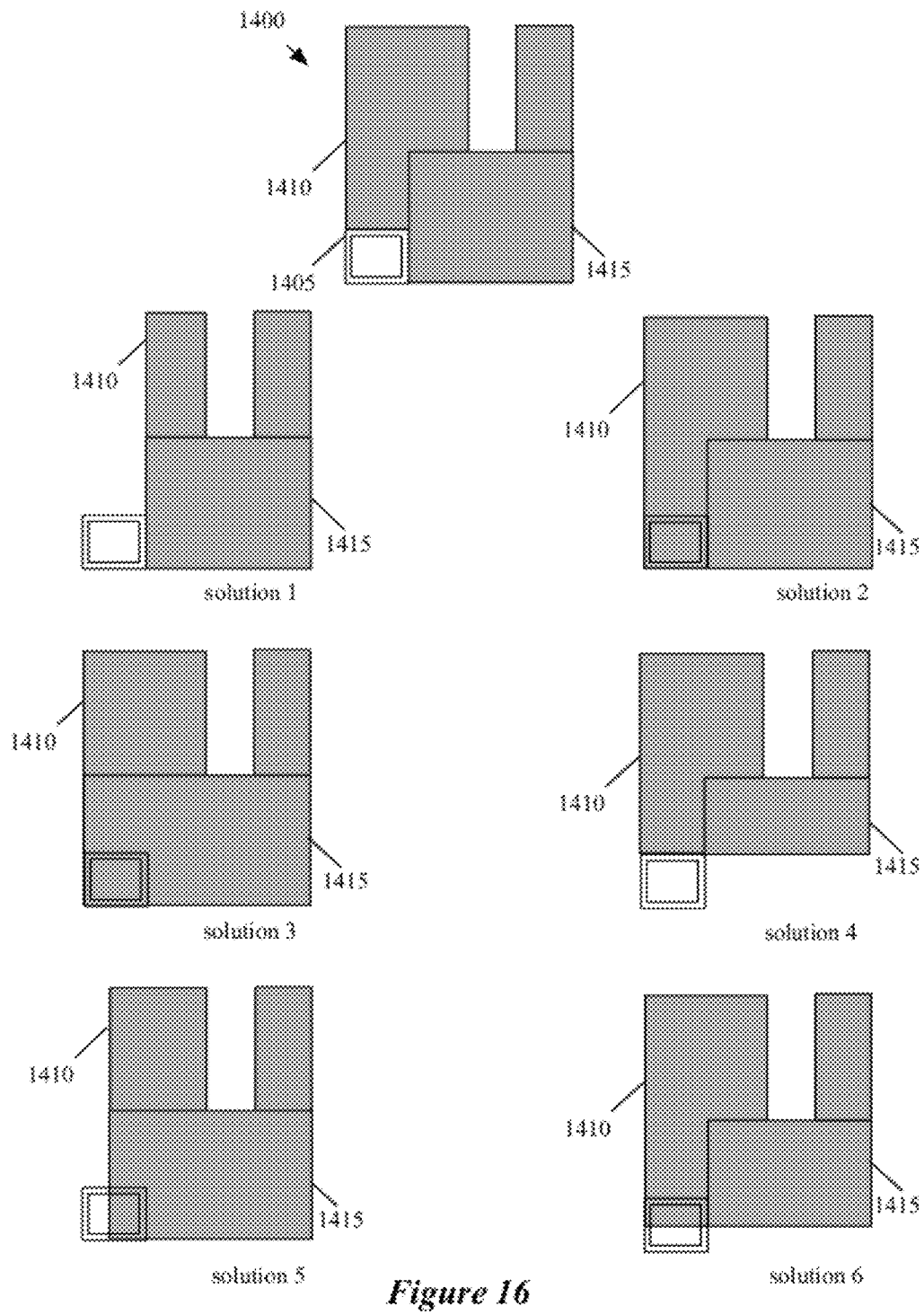

FIG. 16 illustrates examples of the design layout 1400 when each of these six solutions to the edge violation committed by the shapes 1410 and 1415 is applied to the layout. Like the solutions to a width violation, some solutions to an edge violation do not entail moving the relevant shapes by certain distances. Instead, some of these solutions suggest enlarging or reducing the sizes of the relevant shapes by moving the relevant edges.

As shown, solution 1 moves the left edge of the shape 1410 to the right by the length of the upper edge of the marker 1405 without moving the shape 1410 itself (i.e., without moving any other edges of the shape 1410). As a result, the inward corner that was formed by the shapes 1410 and 1415 is removed from the layout 1400, but the size of the shape 1410 is reduced. While it is possible to remove the inward corner by applying solution 1 in such a way that the shape 1410 is moved as the left edge of the shape is moved to the left, some embodiments do not move the shape 1410 itself and just reduce the size of the shape in order not to cause the shape to touch or get too close to another shape.

Solution 2 moves down the bottom edge of the shape 1410 to remove the inward corner without moving any other edges of the shape 1410. The shape 1410 is enlarged as a result of moving the bottom edge of the shape 1410. Solution 3 moves the left edge of the shape 1415 to the left and enlarges the size of the shape 1415 instead of moving the shape to the left in order not to detach 1415 from another shape in the design layout. Solution 4 moves the bottom edge of the shape 1415 upwards to remove the inward corner. The shape 1415 is reduced as a result of moving the bottom edge upwards.

Solution 5 moves the left edge of the shape 1410 to the right and the left edge of the shape 1415 to the left such that the inward corner is removed from the layout 1400. The size of the shape 1410 is reduced and the shape 1415 is enlarged as a result of applying solution 5 without moving the relevant shapes themselves. Likewise, solution 6 moves the bottom edge of the shape 1410 downward and the bottom edge of the shape 1415 upwards in order to remove the inward corner. The shape 1410 is enlarged while the size of the shape 1415 is reduced.

Several examples of generating design solutions that remedy design rule violations have been described in Section I. Section II will now describe transforming coordinates of some shapes before generating design solutions to a design rule violation that is committed by the shapes.

II. Transformation of Coordinates

For some embodiments of the invention, design layouts that have layers and shapes are stored as data in a repository such as the design layouts repository 205. In some embodiments, these data for the design layouts and their layers and shapes are parsed by a design software application and are converted into software objects that can be manipulated by the software application such as design solution generator 220. These software objects in some embodiments can be brought into one design layout from another design layout. As such, when a design engineer who is using the software application creates a new design layout, the application allows the design engineer to bring in shapes that are created for and exist in another design layout and reuse the shapes in the newly created design layout.

In some embodiments, software objects that represent shapes and layers in a design layout form a hierarchical structure in the design layout. For instance, under a software object that represents the design layout, there are several software objects that represent the layers in the design layout. Under each of the layers, there are software objects that represent shapes organized in several hierarchical levels within the layer in some embodiments. When shapes are created for a layer of the design layout, the software objects that represent the shapes are placed in the top level under the software object that represent the layer. When shapes are brought into the design layout from another design layout, the software objects that represent the shapes are initially placed in a level below the top level in the hierarchy.

In some cases, when the shapes are just brought into the first design layout from the second design layout, the shapes still have the attributes they had in the second design layout. For instance, the shapes have their coordinates relative to the origin of the coordinates in the second layout when the shapes are initially brought into the first design layout. However, when the locations that the shapes are placed have different coordinates relative to the origin of the coordinates in the first layout, the coordinates of the shapes must be transformed so that the values of the transformed coordinates correctly represent the locations relative to the origin of the first design layout. In some embodiments, the software objects that represent the shapes are moved to the top level of the layer in the hierarchy once the shapes' attributes (e.g., coordinates) for the second layout are transformed into the attributes for the first design layout.

Figure 17:
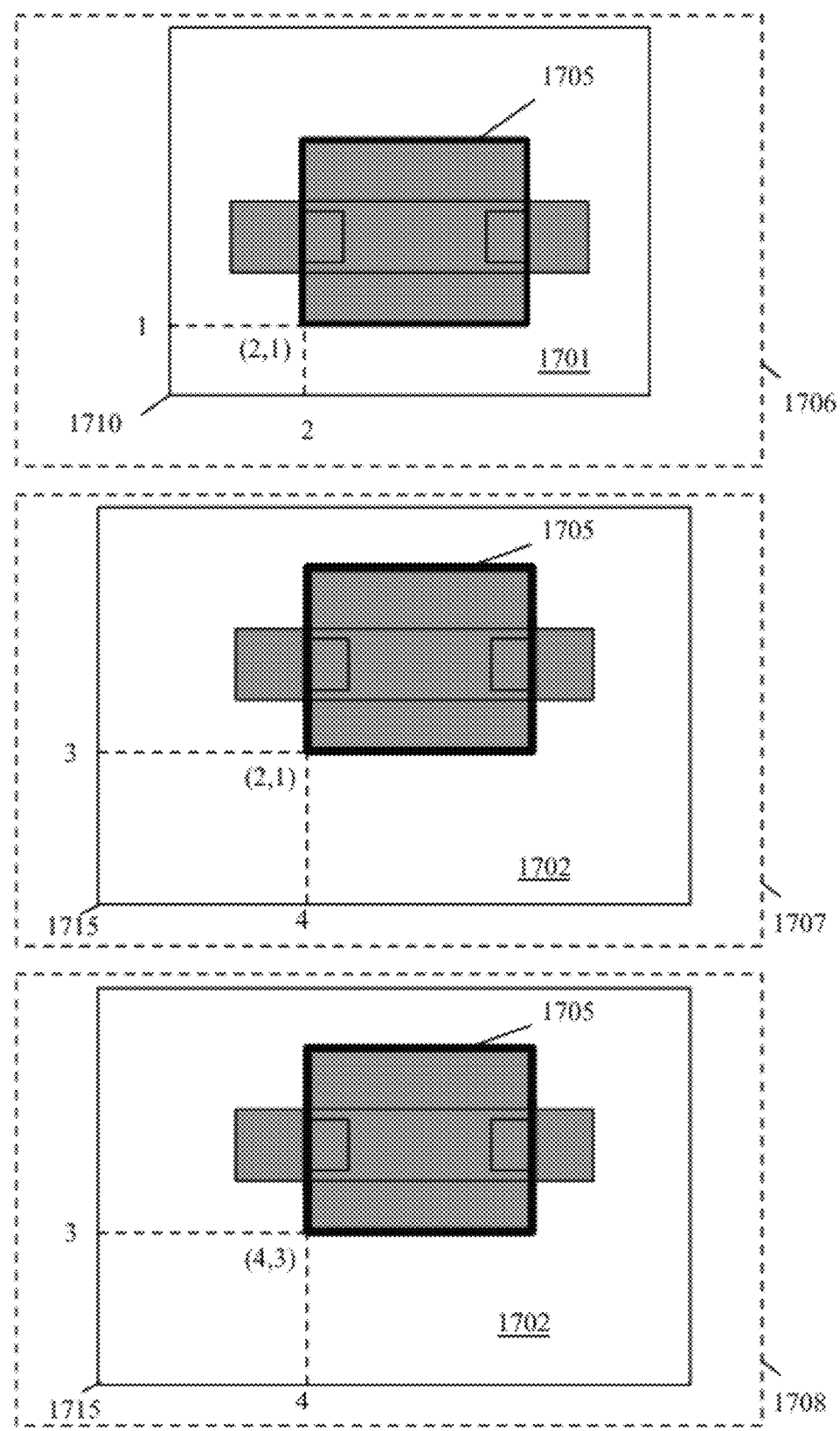
FIG. 17 illustrates transforming coordinates of a shape in some embodiments.

Before design solutions to a design violation in a layer of a first design layout are generated, attributes of shapes that are brought into the first design layout are transformed from the attributes for the second design layout to the attributes for the first design layout. FIG. 17 illustrates an example of transforming coordinates of a shape in a design layout 1700. Specifically, FIG. 17 illustrates transformation of the coordinates of shape 1705 that is brought into a layer of a design layout 1702 from a layer of a design layout 1701 in three stages 1706-1708. FIG. 17 illustrates the shape 1705 which is depicted as a rectangle with a thick border. The origins of the coordinates for the design layouts 1701 and 1702 are the lower left corners (1710 and 1715, respectively) of the layouts which are depicted as rectangles that include the shape 1705.

At stage 1706, the shape 1705 exists in a layer of the design layout 1701. As shown, the coordinates of the lower left corner of the shape 1705 are (2, 1) in this example.

At stage 1707, the shape 1705 is brought into the design layout 1702 and initially has the coordinates (2, 1) that represent the corner's location relative to the origin of the coordinates for the design layout 1701. However, since the location of the shape 1705 relative to the origin of the coordinates for the design layout 1702 is different, the coordinates (2,1) do not correctly represent the location of the lower left corner of the shape 1705 in the design layout 1702. At this stage, a software object that represents the shape 1705 is in a level below the top level of a hierarchical structure formed by software objects that represent shapes and layers in the design layout 1702.

At stage 1708, the coordinates of the corner are transformed to correctly represent the corner's location relative to the origin of the coordinates for the design layout 1702. At this stage, the software object that represent the shape 1705 is now moved up to the top level of the hierarchical structure and thus can be used in generating design solutions to a design violation in the design layout 1702.

In some cases, all shapes in a layer of a second design layout are brought into a first design layout together. In such cases, the coordinates of the shapes are transformed using appropriate mathematical formulas. For instance, when the orientation of the coordinate axes for the first and second design layouts are the same but the location that represents the origin of the coordinates for the second design layout does not coincide with the location of the origin of the coordinates for the first design layout, the formulas to transform the coordinates of the shapes are:

$$X_{new} = X_{offset} + X_{old}; \text{ and}$$

$$Y_{new} = Y_{offset} + Y_{old},$$

where ($X_{new}$, $Y_{new}$) are the transformed coordinates of a shape in the first design layout and ($X_{old}$, $Y_{old}$) are the coordinates for the shape in the second design layout. $X_{offset}$ and $Y_{offset}$ are offsets calculated based on the location of the origin for the second design layout relative to the origin for the first design layout. Using these formulas, the coordinates of the shape 1705 can be transformed. The offsets that are used to transform the coordinates of the lower left corner of the shape 1705 in this example are (+2, +2) because the origin of coordinates for the design layout 1701 would have been located at a location with coordinates (2, 2) in the design layout 1702 had the whole layer of the design layout 1701 been brought into the design layout 1702. As the coordinates of the shape 1705 for the design layout 1701 are (2, 1), the transformed coordinates are (4, 3) as shown in the stage 1708.

Different formulas are used for different cases of transformation in some embodiments. For instance, when the orientation of the coordinate axes for the second design layout are rotated by 90 degrees counterclockwise relative to the coordinate axes for the first design layout and the locations of the origins of the coordinates for the first and second design layouts do not coincide, the formulas to be used to transform the coordinates are:

$$X_{new}=X_{offset}-Y_{old}; \text{ and}$$

$$Y_{new}=Y_{offset}+X_{old}.$$

The transformed coordinates of the lower left corner of the shape 1705 using these formulas are (2−1=1, 2+2=4).

When the orientation of the coordinate axes for the second design layout are rotated by 180 degrees counterclockwise relative to the coordinate axes for the first design layout and the locations of the origins of the coordinates for the first and second design layouts do not coincide:

$$X_{new}=X_{offset}-X_{old}; \text{ and}$$

$$Y_{new}=Y_{offset}-Y_{old}.$$

The transformed coordinates of the lower left corner of the shape 1705 using these formulas are (2−2=0, 2−1=1).

When the orientation of the coordinate axes for the second design layout are rotated by 270 degrees counterclockwise relative to the coordinate axes for the first design layout and the locations of the origins of the coordinates for the first and second design layouts do not coincide:

$$X_{new}=X_{offset}+Y_{old}; \text{ and}$$

$$Y_{new}=Y_{offset}-X_{old}.$$

The transformed coordinates of the lower left corner of the shape 1705 using these formulas are (2+1=3, 2−2=0).

When the orientation of the coordinate axes for the second design layout is flipped over the x-axis and the locations of the origins of the coordinates for the first and second design layouts do not coincide, the formulas to be used to transform the coordinates are:

$$X_{new}=X_{offset}+X_{old}; \text{ and}$$

$$Y_{new}=Y_{offset}-Y_{old}.$$

The transformed coordinates of the lower left corner of the shape 1705 using these formulas are (2+2=4, 2−1=1).

When the orientation of the coordinate axes for the second design layout is flipped over the y-axis and the locations of the origins of the coordinates for the first and second design layouts do not coincide, the formulas to be used to transform the coordinates are:

$$X_{new}=X_{offset}-X_{old}; \text{ and}$$

$$Y_{new}=Y_{offset}+Y_{old}.$$

The transformed coordinates of the lower left corner of the shape 1705 using these formulas are (2−2=0, 2+1=3).

The coordinates and formulas that have been described above for some embodiments are based on the Cartesian coordinates system. However, one of ordinary skill in the art will recognize that other coordinates system (e.g., Polar coordinates system) can be used in other embodiments.

III. Using Design Solutions

Some embodiments select a design solution from several design solutions generated for a design violation in a design layout and changes the design layout based on the selected design solution. Different embodiments make a selection of a design solution differently. For instance, some embodiments sequentially examine each of the generated design solutions to determine whether the solution causes any new design rule violations when the solution is applied and selects the first solution that does not cause any new design rule violations to the design layout. In some cases, every one of the generated design solutions for a design violation causes one or more new design rule violations. In such cases, some embodiments select one of such design solutions, apply the selected solution to the set of shapes, and generate a set of markers that correspond to the new design rule violations caused by the selected design solution. Some such embodiments select a design solution that causes the least number of new design violations.

A. Software Modules

Figure 18:
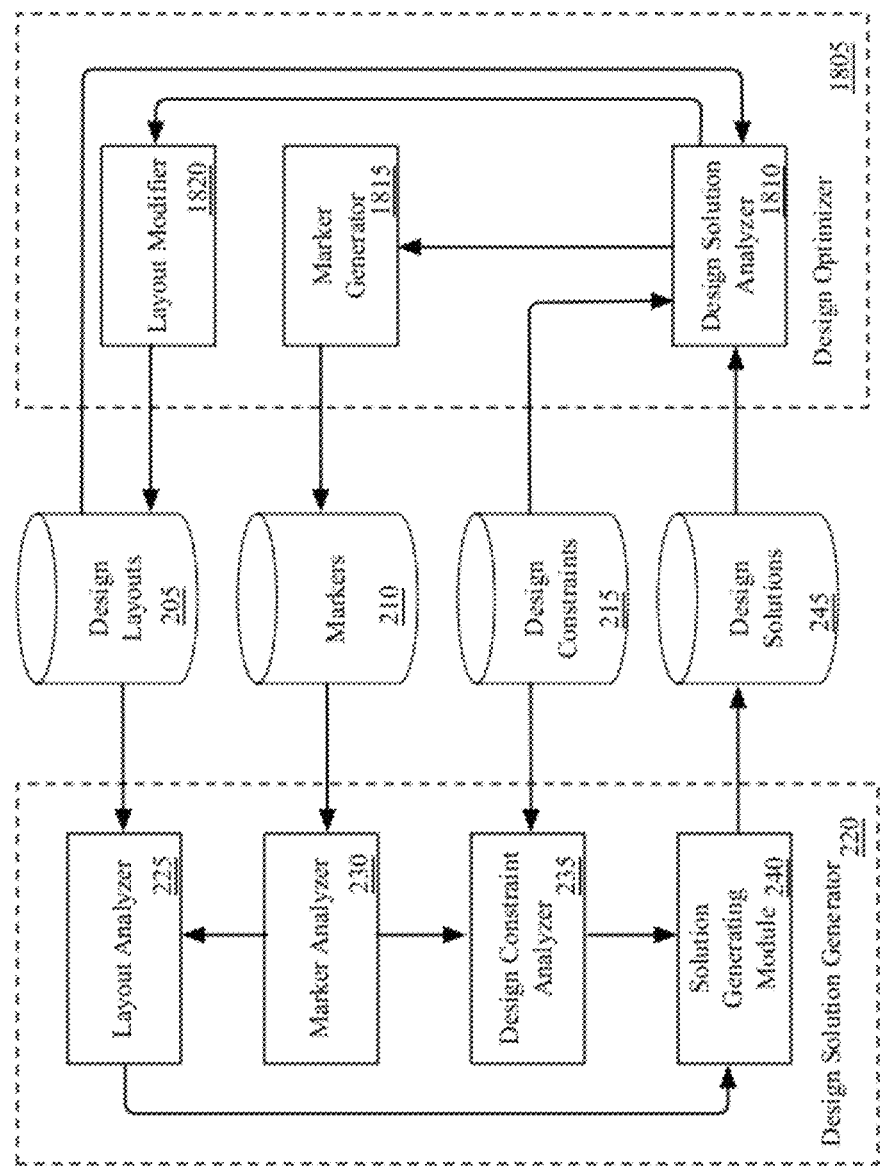
FIG. 18 illustrates a design solution generator and a design optimizer of some embodiments.

In some embodiments, the processes described above are implemented as software running on a particular machine, such as a computer, a device with electronic components, etc. FIG. 18 conceptually illustrates example architecture for several software modules in some embodiments. Specifically, FIG. 18 illustrates that these modules generate design solutions to a design rule violation in a design layout, select a design solution, and apply the selected solution to the design layout. FIG. 18 illustrates the design layouts depository 205, the marker repository 210, the design constraints repository 215, the design solution generator 220, and the design solutions repository 245 described above by reference to FIG. 2. FIG. 18 also illustrates a design optimizer 1805 that includes a design solution analyzer 1810, a marker generator 1815, and a layout modifier 1820.

In some embodiments, some of these modules are standalone software applications. In other embodiments, some of these modules are parts of a software application. For instance, each of the design solution generator 220 and the design optimizer 1805 is part of separate software applications in some embodiments. In other embodiments, the design solution generator 220 and the design optimizer 1805 are parts of a single software application that generates and uses design solutions. Yet, in some other embodiments, only some of the modules within the design solution generator 220 and the design optimizer 1805 are part of a software application.

The design optimizer 1805 in some embodiments is a module that receives design solutions to a design rule violation committed by a set of shapes in a design layout, selects a design solution to use, and changes the design layout based on the selected design solution. In some cases, the design optimizer selects a design solution that causes new design violations in the layout when applied to the layout. The design optimizer 1805 in some such embodiments generates markers for the new design violations and deposits them in the markers repository 210.

The design solution analyzer 1810 of the design optimizer 1805 in some embodiments selects a design solution from several design solutions that it retrieves or receives from the design solutions repository 245. The design solution analyzer 1810 sends the selected design solution to the layout modifier 1820 for the modifier 1820 to change the layout according to the selected design solution. In some cases, the design solution analyzer 1810 identifies new design rule violations caused by the selected design solutions. The design solution analyzer 1810 sends information regarding the new design rule violations to the marker generator 1815 for the generator 1815 to generate markers for the new violations.

In order to select a design solution, the design solution analyzer 1810 in some embodiments examines the retrieved design solutions by applying them sequentially to the design layout that includes the set of shapes that violate the design rule. The design solution analyzer 1810 retrieves the design layout from the design layouts repository 205. Each time a design solution is applied to the retrieved design layout, the design solution analyzer 1810 verifies the design layout against the design rules that it retrieves from the design constraints repository 215 and identifies any new design rule violation caused by the applied design solution.

When no new design violations are identified in the design layout when a design solution is applied, the design solution analyzer 1810 in some embodiments selects that design solution and sends it to the layout modifier 1820. In some such embodiments, the design solution analyzer 1810 does not examine the rest of the design solutions once a design solution is selected. Alternatively, instead of selecting the first design solution that does not cause any new design rule violations, the design solution analyzer 1810 in some embodiments first identifies all the design solutions that do not cause any new design violations and selects one of such design solutions to send to the layout modifier 1820 based on certain criteria. For instance, the design solution analyzer 1810 selects a design solution that requires the least number of shapes to change. As another example, the design solution analyzer 1810 selects a design solution that does not require changing a shape that represents a particular type of an IC component (e.g., a via) in the design layout.

In some cases, when all design solutions generated for the design violation cause new design violations, the design solution analyzer 1810 selects one of those design solutions based on certain criteria. For instance, the design solution analyzer 1810 selects a design solution that causes the least number of new design violations. The design solution analyzer 1810 may also use the same criteria that it uses for selecting a design solution among design solutions that do not cause new design violations.

The marker generator 1815 in some embodiments generates markers based on the information regarding design violations that it receives from the design solution analyzer 1810. Such information includes identification of the violated design rule, identification of the design layout that includes the set of shapes that violates the design rule, identification of the layer of the layout on which the rule is violated, and location information (e.g., coordinates) of the shapes in the set of shapes on the design layout, etc. The marker generator 1815 deposits the generated markers in the markers repository 210.

The layout modifier 220 in some embodiments uses a design solution that it receives from the design solution analyzer 1810 to change the design layout that contains a design rule violation. The layout modifier 220 modifies the design layout according to the received design solution and deposits the modified layout in the design layouts repository 205.

The design solution analyzer 1810 in this example receives or retrieves a set of design solutions generated by the design solution generator 220 through the design solutions repository 245. The design solution generator 220 examines each of the design solutions in the set to determine whether the design solution causes any new design violations in the design layout by applying the solution to the design layout. The design solution analyzer 1810 then selects the first design solution that does not cause any new design violations and sends it to the layout modifier 1820. The layout modifier changes the design layout according to the selected design solution and deposits the changed layout in the design layouts repository 205.

When all design solutions cause new design violations, the design solution analyzer 1810 selects a design solution that suggests changing the least number of the shapes. The design solution analyzer 1810 then sends information regarding the new design violations to the marker generator 1815. Upon receiving the information, the marker generator 1815 generates a marker for each of the new design rule violations and deposits the markers in the markers repository 210. The design solution analyzer 1810 also sends the selected design solution to the layout modifier 1820. The layout modifier 1820 changes the design layout according to the selected design solution and deposits the changed layout in the design layouts repository 205.

B. Process to Generate and Use Design Solutions

Figure 19:
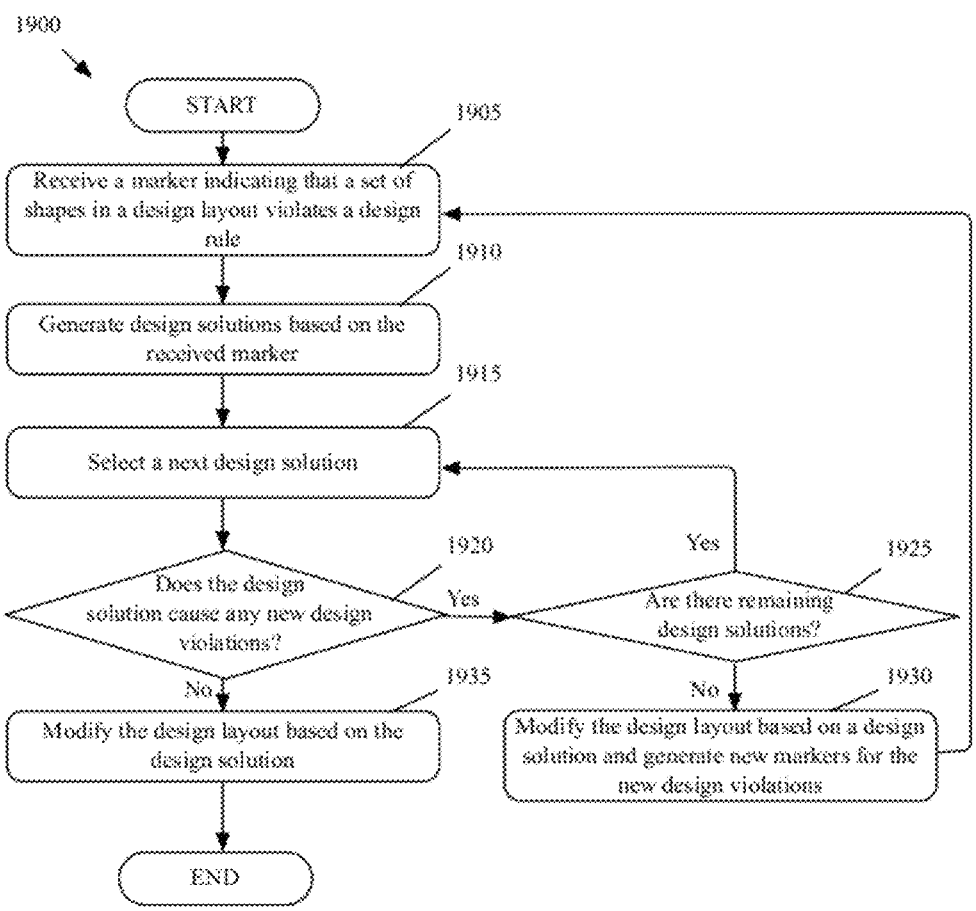
FIG. 19 conceptually illustrates a process that some embodiments use to generate and use design solutions.

FIG. 19 conceptually illustrates a process 1900 of some embodiments which generates design solutions to a design rule violation in a design layout and uses the design solutions to remedy the design rule violation in the design layout. The process in some embodiments is performed by a software application that includes the design solution generator 220 and the design optimizer 1805 or by a system on which the design solution generator 220 and the design optimizer 1805 are executed. The process 19 is performed when a user executes the software application or runs the system in order to modify a design layout that contains a design rule violation.

As shown, process 1900 retrieves or receives (at 1905) a marker that indicates that a set of shapes in the design layout violates a design rule. As described above, a marker in some embodiments includes data that indicates that a design constraint is not abided (i.e., a design rule is violated) by a set of shapes in a design layout. A marker is described above in detail by reference to FIG. 2. The process retrieves or receives the marker from a repository such as the markers repository 210 described above by reference to FIG. 2

Next, the process generates (at 1910) several design solutions based on the received marker. An example set of operations that the process 1900 performs to generate design solutions is described above by reference to FIG. 4. The process in some embodiments stores the generated design solutions in a repository such as the design solutions repository 245 described above by reference to FIG. 2.

The process 1900 then selects (at 1915) a next design solution of the generated design solutions. The process retrieves the design solution from the repository and the design layout that contains the design violation. The process changes the design layout according to the design solution without committing the changes to the design layout in some embodiments (i.e., without saving the design layout as changed or without depositing the changed layout into a repository such as the design layouts repository 205 described above by reference to FIG. 18).

Based on the changed design layout, the process determines (at 1920) whether the design solution causes any new design violations in the design layout. In order to determine, the process retrieves design rules and verify the changed design layout against each of the retrieved design rules. When the process determines (at 1920) that the design solution causes one or more new design violations in the design layout, the process proceeds to 1925 which will be described further below.

After process 1900 determines (at 1920) that the design solution does not cause any new design violations in the design layout, the process modifies (at 1935) the design layout based on the design solution. The process in some embodiments modifies the design layout by committing the changes made to the design layout. The process then ends.

When the process 1900 determines (at 1920) that the design solution causes one or more new design violations in the design layout, the process determines (at 1925) whether there are any generated design solutions left to be verified. When there are more design solutions left, the process loops through operations 1915 and 1920 in order to continue examining the remaining design solutions.

Otherwise, the process selects (at 1930) a design solution from all generated design solutions and generates new markers for the new design violations caused by the selected design solution. Process 1900 in different embodiments selects a design solution differently. For instance, the process selects a design solution that causes the least number of new design violations. As another example, the process in some embodiments selects a design solution that requires the least number of shapes to change. As a third example, the process in some embodiments selects a design solution that does not require changing a shape that represents a particular type of an IC component (e.g., a via) in the design layout. In some embodiments, process 1900 stores the generated (at 1925) markers in a repository such as the markers repository 210 described above by reference to FIGS. 2 and 18.

Alternatively or optionally, when process 1900 determines (at 1925) that there are no more generated design solutions left, the process in some embodiments leaves up to the user a decision on whether to use any of the generated design solution and which one of the generated solutions to use. In some such embodiments, the process notifies the user (e.g., via a pop up message or a message log) that all of the generated design solutions for the design violation cause new design rule violations and ends.

After the process 1900 modifies (at 1930) the design layout based on the selected design solution and generates markers for the new design rule violations caused by the selected design solution, the process proceeds to 1905 to retrieve a marker.

One of ordinary skill in the art will recognize that process 1900 is a conceptual representation of the operations used to receive a marker, generate design solutions based on the marker, select a design solution, and apply the selected design solution to remedy a design violation. The specific operations of process 1900 may not be performed in the exact order shown and described. The specific operations may not be performed in one continuous series of operations, and different specific operations may be performed in different embodiments. Furthermore, the process could be implemented using several sub-processes, or as part of a larger macro process.

For instance, in some embodiments, process 1900 is performed by one or more design software applications that are executing on one or more computers. Specifically, receiving a marker at 1905 and generating design solutions at 1910 may be performed by one design software application running on one computer, and selecting a design solution at 1915, 1920, and 1925 and modifying design solution at 1935 and 1930 may be performed by another design software application running on the same or different computer.

C. Data Structures

Figure 20:
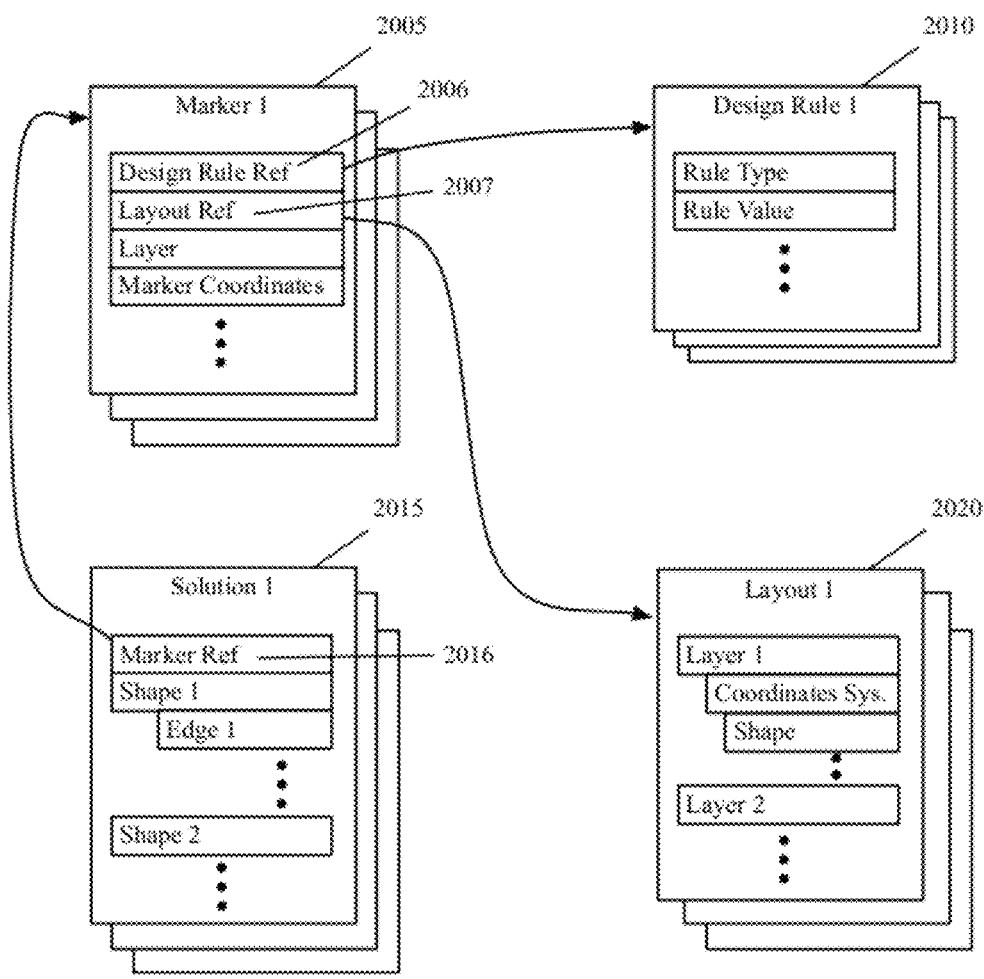
FIG. 20 illustrates data structures of some embodiments.

FIG. 20 illustrates example data structures for markers, design solutions, design constraints, and design layouts used by some embodiments of the invention.

As shown, a data structure 2005 for a marker in some embodiments includes a reference 2006 to a design rule that is violated, a reference 2007 to the design layout in which the design rule is violated, an identification of the layer of the design layout on which the design rule is violated, and coordinates of the marker. In some embodiments, the data structure 2005 for a marker includes the data structure 2010 for a design rule, instead of having a reference to the data structure 2010 for a design layout.

The data structure 2010 for a design rule in some embodiments includes a rule type (e.g., a minimum space rule, a minimum width rule, a minimum area rule, a minimum edge rule, etc.) and a rule value that corresponds to the rule type (e.g., a minimum distance between two shapes, a minimum width of a shape, a minimum size of a shape, a minimum length of edges that form an inward corner, etc.).

A data structure 2015 for a design solution in some embodiments includes a reference 2016 to the marker in which information regarding the design rule violation that the solution can remedy is included. The data structure 2015 also includes a list of relevant shapes that need to be changed (e.g., moved, reduced, enlarged, etc.) and their new changed coordinates for each edge of the shape. In some embodiments, the data structure 2015 for a design solution includes the marker, instead of having a reference to the data structure 2005.

A data structure 2020 for a design layout in some embodiments includes a list of layers that are in the design layout. Each of the layers in the list includes information about the layer's coordinates system and a list of sets of coordinates. Each set of coordinates is a set of coordinates of vertexes of a segment or shape on the layer in some embodiments.

VI. Computer System

Many of the above-described processes and modules are implemented as software processes that are specified as a set of instructions recorded on a non-transitory computer readable storage medium (also referred to as "computer readable medium" or "machine readable medium"). These instructions are executed by one or more computational elements, such as one or more processing units of one or more processors or other computational elements like Application-Specific ICs ("ASIC") and Field Programmable Gate Arrays ("FPGA"). The execution of these instructions causes the set of computational elements to perform the actions indicated in the instructions. Computer is meant in its broadest sense, and can include any electronic device with a processor. Examples of non-transitory computer readable media include, but are not limited to, Compact Disc Read-Only Memories ("CD-ROM"), flash drives, Random Access Memory ("RAM") chips, hard drives, Erasable Programmable Read-Only Memories ("EPROM"), etc. The computer readable media do not include carrier waves and/or electronic signals passing wirelessly or over wired connection.

In this specification, the term "software" includes firmware residing in read-only memory or applications stored in magnetic storage that can be read into memory for processing by one or more processors. Also, in some embodiments, multiple software inventions can be implemented as parts of a larger program while remaining distinct software inventions. In some embodiments, multiple software inventions can also be implemented as separate programs. Finally, any combination of separate programs that together implement a software invention described herein is within the scope of the invention. In some embodiments, the software programs when installed to operate on one or more computer systems define one or more specific machine implementations that execute and perform the operations of the software programs.

FIG. 21 conceptually illustrates a computer system 2100 with which some embodiments of the invention are implemented. Such a computer system includes various types of non-transitory computer readable media and interfaces for various other types of non-transitory computer readable mediums. Computer system 2100 includes a bus 2110, at least one processing unit (e.g., a processor) 2120, a system memory 2130, a read-only memory (ROM) 2140, a permanent storage device 2150, input devices 2170, output devices 2180, and a network connection 2190. The components of the computer system 2100 are electronic devices that automatically perform operations based on digital and/or analog input signals.

One of ordinary skill in the art will recognize that the computer system 2100 may be embodied in other specific forms without deviating from the spirit of the invention. For instance, the computer system may be implemented using various specific devices either alone or in combination. For example, a local personal computer (PC) may include the input devices 2170 and output devices 2180, while a remote PC may include the other devices 2110-2150, with the local PC connected to the remote PC through a network that the local PC accesses through its network connection 2190 (where the remote PC is also connected to the network through a network connection).

The bus 2110 collectively represents all system, peripheral, and chipset buses that communicatively connect the numerous internal devices of the computer system 2100. In some cases, the bus 2110 may include wireless and/or optical communication pathways in addition to or in place of wired connections. For example, the input devices 2170 and/or output devices 2180 may be coupled to the system 2100 using a wireless local area network (W-LAN) connection, Bluetooth®, or some other wireless connection protocol or system.

The bus 2110 communicatively connects, for example, the processor 2120 with the system memory 2130, the ROM 2140, and the permanent storage device 2150. From these various memory units, the processor 2120 retrieves instructions to execute and data to process in order to execute the processes of some embodiments. In some embodiments the processor includes an FPGA, an ASIC, or various other electronic components for execution instructions.

The ROM 2140 stores static data and instructions that are needed by the processor 2120 and other modules of the computer system. The permanent storage device 2150, on the other hand, is a read-and-write memory device. This device is a non-volatile memory unit that stores instructions and data even when the computer system 2100 is off. Some embodiments of the invention use a mass-storage device (such as a magnetic or optical disk and its corresponding disk drive) as the permanent storage device 2150.

Other embodiments use a removable storage device (such as a floppy disk, flash drive, or CD-ROM) as the permanent storage device. Like the permanent storage device 2150, the system memory 2130 is a read-and-write memory device. However, unlike storage device 2150, the system memory 2130 is a volatile read-and-write memory, such as a random access memory (RAM). The system memory stores some of the instructions and data that the processor needs at runtime. In some embodiments, the sets of instructions and/or data used to implement the invention's processes are stored in the system memory 2130, the permanent storage device 2150, and/or the read-only memory 2140. For example, the various memory units include instructions for processing multimedia items in accordance with some embodiments.

The bus 2110 also connects to the input devices 2170 and output devices 2180. The input devices 2170 enable the user to communicate information and select commands to the computer system. The input devices include alphanumeric keyboards and pointing devices (also called "cursor control devices"). The input devices also include audio input devices (e.g., microphones, MIDI musical instruments, etc.) and video input devices (e.g., video cameras, still cameras, optical scanning devices, etc.). The output devices 2180 include printers, electronic display devices that display still or moving images, and electronic audio devices that play audio generated by the computer system. For instance, these display devices may display a GUI. The display devices include devices such as cathode ray tubes ("CRT"), liquid crystal displays ("LCD"), plasma display panels ("PDP"), surface-conduction electron-emitter displays (alternatively referred to as a "surface electron display" or "SED"), etc. The audio devices include a PC's sound card and speakers, a speaker on a cellular phone, a Bluetooth® earpiece, etc. Some or all of these output devices may be wirelessly or optically connected to the computer system.

Finally, as shown in FIG. 21, bus 2110 also couples computer 2100 to a network 2190 through a network adapter (not shown). In this manner, the computer can be a part of a network of computers (such as a local area network ("LAN"), a wide area network ("WAN"), an Intranet, or a network of networks, such as the Internet. For example, the computer 2100 may be coupled to a web server (network 2190) so that a web browser executing on the computer 2100 can interact with the web server as a user interacts with a GUI that operates in the web browser.

It should be recognized by one of ordinary skill in the art that any or all of the components of computer system 2100 may be used in conjunction with the invention. Moreover, one of ordinary skill in the art will appreciate that any other system configuration may also be used in conjunction with the invention or components of the invention. For instance, design solution generator 220 and design optimizer 1805 described above be reference to FIGS. 2 and 18 can be implemented using the computing system 2100 with electronic components.

While the invention has been described with reference to numerous specific details, one of ordinary skill in the art will recognize that the invention can be embodied in other specific forms without departing from the spirit of the invention. Moreover, while the examples shown illustrate many individual modules as separate blocks, one of ordinary skill in the art would recognize that some embodiments may combine these modules into a single functional block or element. One of ordinary skill in the art would also recognize that some embodiments may divide a particular module into multiple modules.

One of ordinary skill in the art would understand that the invention is not to be limited by the foregoing illustrative details, but rather is to be defined by the appended claims.

What is claimed is:

1. A method for fixing a design rule violation committed by a set of shapes on a layer of a design layout, the method comprising:

by a computer, generating a set of design solutions based on a marker located between the set of shapes to indicate a design rule violation, wherein a design solution in the set of design solutions specifies a movement of at least one edge of a shape in the set of shapes and when applied to the set of shapes, causes the set of shapes to meet a design rule that was violated by the set of shapes;

applying the design solution from the set of design solutions to the set of shapes;

generating a set of one or more markers for a set of one or more design rule violations that result from applying the design solution to the set of shapes;

determining whether another design solution that has not been applied exists;

applying the another design solution from the set of design solutions to the set of shapes when the another design solution that has not been applied is determined to exist; and generating a set of new markers for a set of new design rule violations resulting from applying the another design solution from the set of design solutions to the set of shapes.

2. The method of claim 1, wherein the marker comprises a rule type and a rule value of the design rule violation and an identification of a layer in a set of layers on which the set of shapes violated the design rule, and the rule value quantifies a design requirement imposed by the design rule.

3. The method of claim 1, wherein the marker comprises a geometric shape having a plurality of edges on a layer in the design layout.

4. The method of claim 1, wherein generating the set of design solutions comprises:
- identifying a set of relevant edges of the set of shapes, a relevant edge abutting an edge of the marker;
- identifying a rule value that quantifies a design requirement imposed by the design rule and a layout value of the set of shapes that quantifies a geometric attribute of the set of shapes; and
- identifying one or more edge movements for the design solution, an edge movement for moving at least one relevant edge of the set of shapes in order to change the layout value to be greater than or equal to the rule value when the design solution is applied to the set of shapes.

5. The method of claim 1, wherein the design rule requires two shapes to be apart by at least a distance defined by the design rule, and the design solution in the set of design solutions comprises one of moving a first edge of a first shape that abuts the first edge of the marker and moving a second edge of a second shape that abuts the first edge or a second edge of the marker away from the marker such that the first edge and the second edge are apart by at least the distance.

6. The method of claim 1, wherein the design rule requires two edges of a shape to be apart by a distance defined by the design rule, and the design solution in the generated set comprises one of moving a first edge of the shape that is identified by the marker and moving a second edge of the shape that is identified by the marker such that the first edge and the second edge are apart by at least the distance.

7. The method of claim 1, wherein at least one design solution specifies a set of coordinates that represents a location in the layer to which the at least one edge of the shape is to move when the at least one design solution is applied to the set of shapes.

8. A non-transitory computer readable medium storing a computer program which when executed by at least one processing unit, causes the at least one processing unit to fix a design rule violation caused by a set of shapes on a layer of a design layout, the computer program comprising:
- a set of instructions executable to generate a plurality of design solutions based on a marker to indicate a design rule violation, wherein a design solution in the plurality of design solutions specifies a movement of at least one edge of a shape in the set of shapes that is identified by the marker and when applied to the set of shapes, causes the set of shapes to meet a design rule that was violated by the set of shapes;
- a set of instructions executable to apply the design solution from the plurality of design solutions to the set of shapes;
- a set of instructions executable to generate a set of one or more first markers for a set of one or more design rule violations that result from applying the design solution to the set of shapes;
- a set of instructions executable to determine whether another design solution that has not been applied exists;
- a set of instructions executable to apply another design solution from the plurality of design solutions to the set of shapes when the another design solution that has not been applied is determined to exist; and
- a set of instructions executable to generate a set of new markers for a set of new design rule violations resulting from applying the another design solution from the plurality of design solutions to the set of shapes.

9. The non-transitory computer readable medium of claim 8, wherein the marker comprises a geometric shape having a plurality of edges on the layer in the design layout.

10. The non-transitory computer readable medium of claim 9, wherein the set of shapes form an inward corner, the marker occupies the inward corner, the design rule requires the set of shapes to have at least a length defined by the design rule along edges of shapes in the set of shapes that form the inward corner, and at least one design solution in the plurality of design solutions comprises moving a first edge of a first shape that abuts a first edge of the marker or a second edge of a second shape that abuts the first edge or the second edge of the marker such that the set of shapes no longer forms the inward corner.

11. The non-transitory computer readable medium of claim 8, wherein an edge of a shape in the set of shapes is identified by the marker when the edge is adjacent to the marker.

12. The non-transitory computer readable medium of claim 8, wherein the set of instructions executable to generate a particular design solution from the plurality of design solutions further comprises a first set of instructions executable to move an entire shape in order to move an edge of the entire shape that is identified by the marker.

13. The non-transitory computer readable medium of claim 8, wherein the computer program further comprises:
- a first set of instructions executable to examine a plurality of design solutions in the plurality of design solutions sequentially until a particular design solution that does not cause any new design violations when applied to the set of shapes in the design layout is found; and
- a second set of instructions executable to specify the particular design solution as the design solution that is applied to the set of shapes.

14. The non-transitory computer readable medium of claim 8, wherein the plurality of design solutions comprises:
- a first design solution specifying a first movement of a first edge of a first shape in the set of shapes; and
- a second design solution specifying a second movement of a second edge of a second, different shape in the set of shapes that is identified by the marker, wherein applying either the first design solution or the second design solution to the set of shapes causes the set of shapes to meet a design rule that was violated by the set of shapes.

15. The non-transitory computer readable medium of claim 14, wherein the second design solution also specifies a third movement of the first edge of the first shape.

* * * * *